US012764116B2

(12) United States Patent
Gupta et al.

(10) Patent No.: US 12,764,116 B2
(45) Date of Patent: Oct. 13, 2026

(54) METHOD AND SERVER FOR PROVIDING USER CONSENT TO EDGE APPLICATION

(71) Applicant: Samsung Electronics Co., Ltd., Gyeonggi-do (KR)

(72) Inventors: Nishant Gupta, Sitapur (IN); Rajavelsamy Rajadurai, Banagalore (IN); Narendranath Durga Tangudu, Bangalore (IN)

(73) Assignee: Samsung Electronics Co., Ltd (KR)

( * ) Notice: Subject to any disclaimer, the term of this patent is extended or adjusted under 35 U.S.C. 154(b) by 591 days.

(21) Appl. No.: 17/612,477

(22) PCT Filed: Jun. 15, 2020

(86) PCT No.: PCT/KR2020/007706
§ 371 (c)(1),
(2) Date: Nov. 18, 2021

(87) PCT Pub. No.: WO2020/256366
PCT Pub. Date: Dec. 24, 2020

(65) Prior Publication Data

US 2022/0263832 A1 Aug. 18, 2022

(30) Foreign Application Priority Data

Jun. 17, 2019 (IN) ............................ 201941023952
Jun. 3, 2020 (IN) ............................ 2019 41023952

(51) Int. Cl.
*H04L 9/40* (2022.01)
*H04L 67/306* (2022.01)

(52) U.S. Cl.
CPC ........ *H04L 63/102* (2013.01); *H04L 63/0838* (2013.01); *H04L 67/306* (2013.01)

(58) Field of Classification Search
CPC . H04L 63/102; H04L 63/0838; H04L 67/306; H04L 67/10
See application file for complete search history.

(56) References Cited

U.S. PATENT DOCUMENTS 7,188,252 B1 * 3/2007 Dunn .................... H04L 63/102 713/193
7,571,466 B2 * 8/2009 Mitchell ................. G06F 21/31 713/168
(Continued)

FOREIGN PATENT DOCUMENTS

CN 105100494 A * 11/2015
EP 1933252 A1 * 6/2008 .......... H04W 12/068
(Continued)

OTHER PUBLICATIONS

International Search Report dated Sep. 25, 2020 issued in counterpart application No. PCT/KR2020/007706, 3 pages.
(Continued)

*Primary Examiner* — John B King
(74) *Attorney, Agent, or Firm* — The Farrell Law Firm, P.C.

(57) ABSTRACT

Embodiments herein provide a method for providing a service to an edge application (600). The method includes receiving, by a server (500), at least one of a request for accessing the service associated with a User Equipment (300) from the edge application (600), and a request for a user consent associated with the UE (300) from the edge application (600). The method includes retrieving, by the server (500), the user consent from the edge enabler client (100), where the user consent indicates a consent of a user of the edge enabler client (100) to provide at least one of the service and the user consent with the edge application (600). The method includes sending, by the server (500), at least
(Continued)

one of the service and the user consent to the edge application (600).

10 Claims, 19 Drawing Sheets

(56) References Cited

U.S. PATENT DOCUMENTS

| | | | | |
|---|---|---|---|---|
| 10,250,708 | B1 | 4/2019 | Carver et al. | |
| 10,924,475 | B2 * | 2/2021 | Tschofenig | H04L 63/0853 |
| 2007/0100955 | A1 * | 5/2007 | Bodner | G06Q 30/02 709/217 |
| 2008/0070593 | A1 * | 3/2008 | Altman | H04W 4/029 455/457 |
| 2013/0286223 | A1 * | 10/2013 | Latta | H04N 1/00151 348/207.1 |
| 2014/0066018 | A1 * | 3/2014 | Zhu | H04W 12/02 455/411 |
| 2016/0344728 | A1 * | 11/2016 | Jeon | H04L 63/0838 |
| 2017/0359338 | A1 * | 12/2017 | Tschofenig | G06F 21/44 |
| 2018/0191808 | A1 * | 7/2018 | Bhaya | G10L 15/1822 |
| 2018/0247385 | A1 * | 8/2018 | Whitfield | H04L 63/102 |
| 2018/0367483 | A1 * | 12/2018 | Rodriguez | H04L 51/046 |
| 2019/0065731 | A1 | 2/2019 | Brocious et al. | |
| 2019/0327239 | A1 * | 10/2019 | Ferguson | H04L 9/0819 |
| 2020/0287941 | A1 * | 9/2020 | Venkateswaran | H04L 45/64 |
| 2024/0152919 | A1 * | 5/2024 | Shetty | G06Q 20/3825 |

FOREIGN PATENT DOCUMENTS

| | | | | |
|---|---|---|---|---|
| KR | 20200130141 A * | 11/2020 | H04W 12/40 |
| WO | WO-2016097685 A1 * | 6/2016 | G06F 21/44 |

OTHER PUBLICATIONS

Written Opinion dated Sep. 25, 2020 issued in counterpart application No. PCT/KR2020/007706, 6 pages.
3GPP TR 23.758 V0.2.0, May 29, 2019, pp. 32.
3GPP TR 33.849 V14.0.0, Mar. 22, 2016, pp. 33.
3GPP TS 33.180 V16.0.0, Jun. 13, 2019, pp. 200.
Kramer, Alexis, "Major Carriers Hit With Lawsuits Over Location Data Sharing (2)", May 3, 2019, . . . https://news.bloomberglaw.com/tech-and-telecom-law/verizon-accused-of-selling-off-customers-geolocation-data, pp. 1.
Lecher, Colin, "AT&T is getting sued for selling customers' location data", Jul. 16, 2019, . . . https://www.theverge.com/2019/7/16/20696222/att-location-data-tracking-lawsuit-electronic-frontier-foundation, pp. 2.
"EFF Sues AT&T, Data Aggregators For Giving Bounty Hunters and Other Third Parties Access to Customers' Real-Time Locations", Jul. 16, 2019 . . . https://www.eff.org/press/releases/eff-sues-att-data-aggregators-giving-bounty-hunters-and-other-third-parties-access, pp. 2.
Davis, Wendy, "Location Data Was Shared Illegally, FCC Finds", Jan. 31, 2020 . . . https://www.mediapost.com/publications/article/346509/location-data-was-shared-illegally-fcc-finds.html, pp. 5.

* cited by examiner

[Fig. 1]
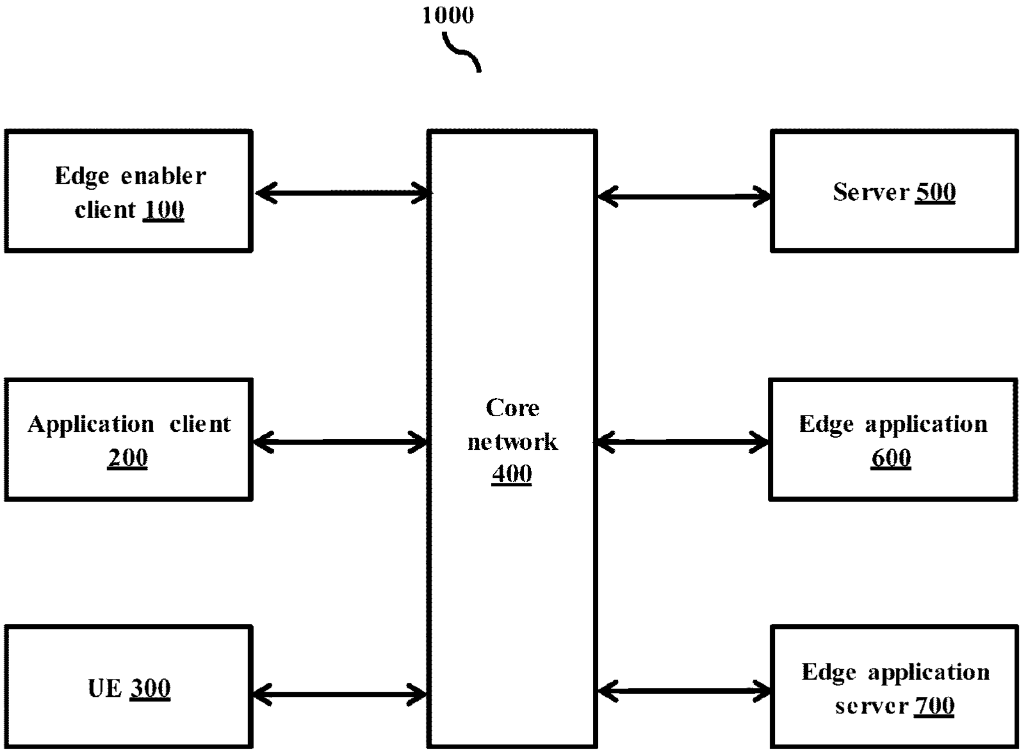
[Fig. 2A]
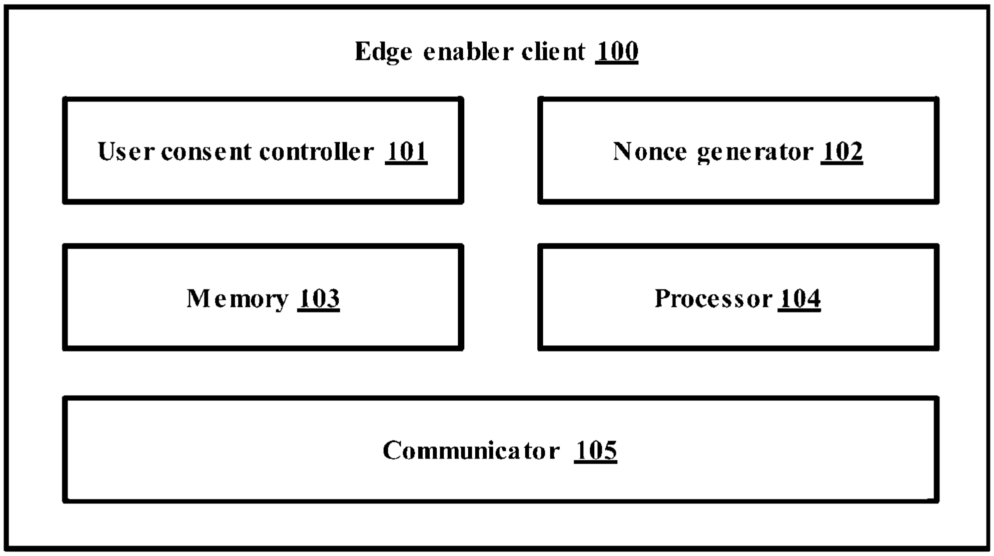

[Fig. 2B]
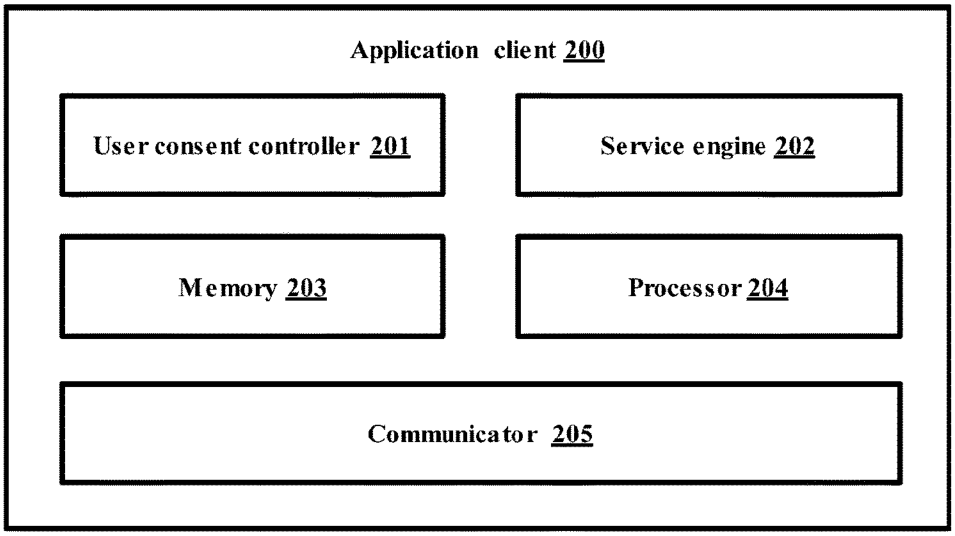
[Fig. 2C]
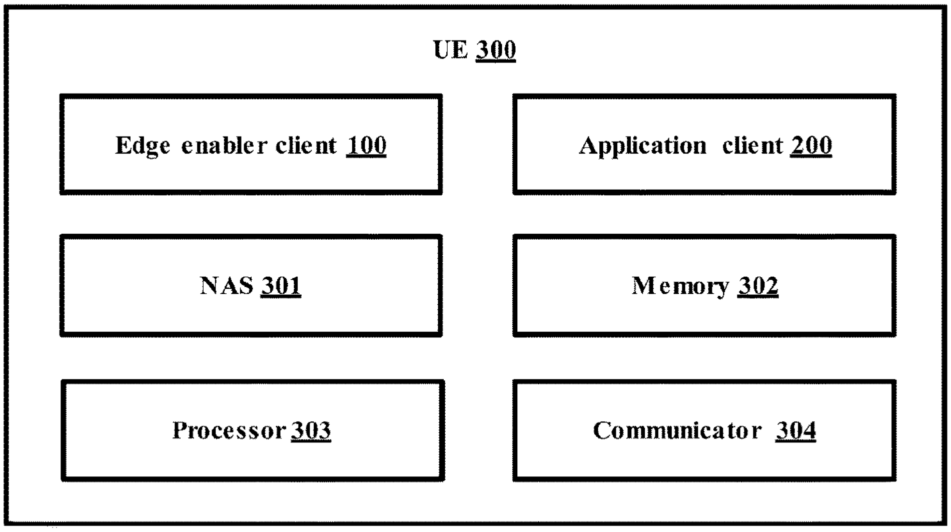
[Fig. 2D]
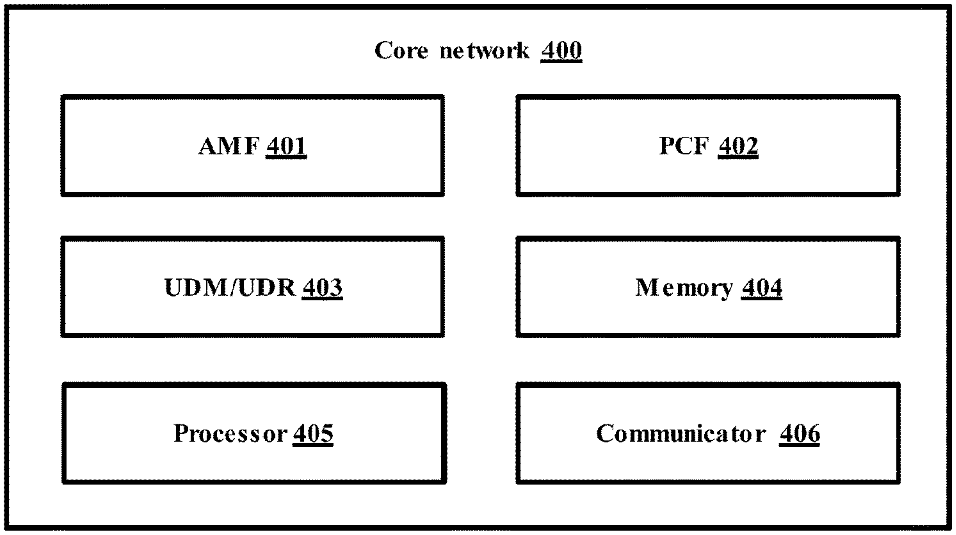

[Fig. 2E]
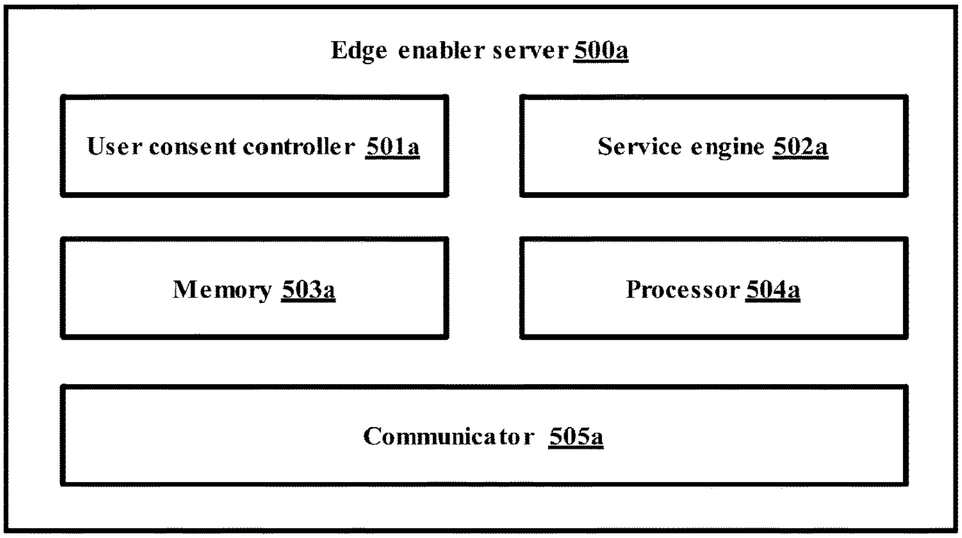
[Fig. 2F]
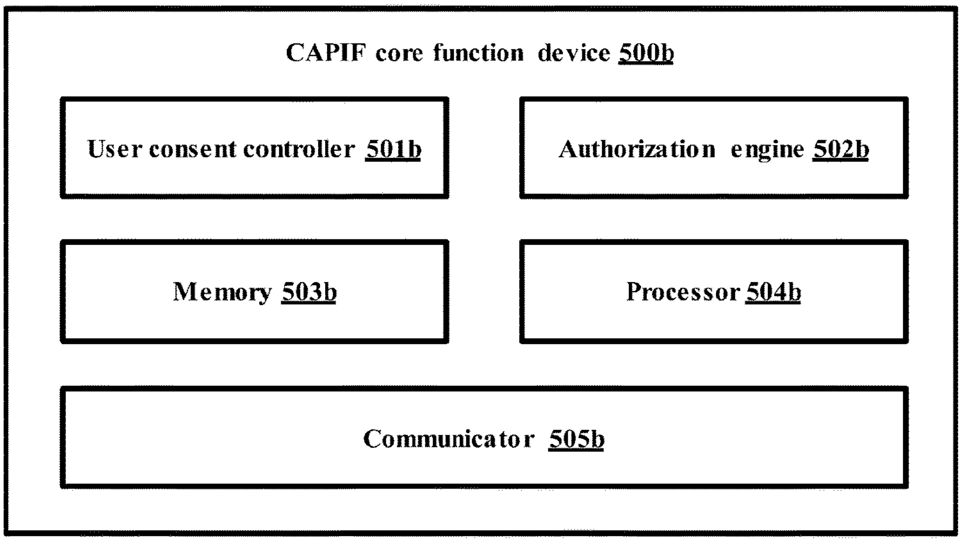
[Fig. 2G]
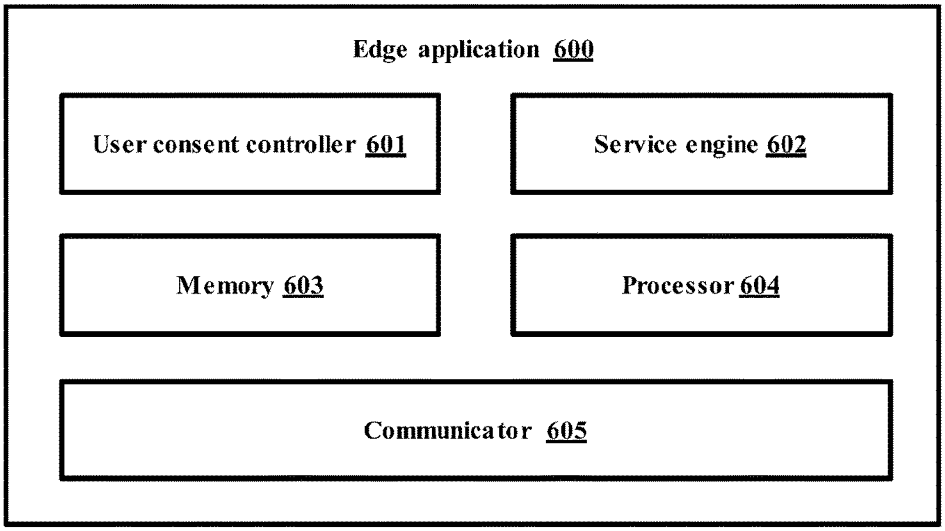

[Fig. 2H]
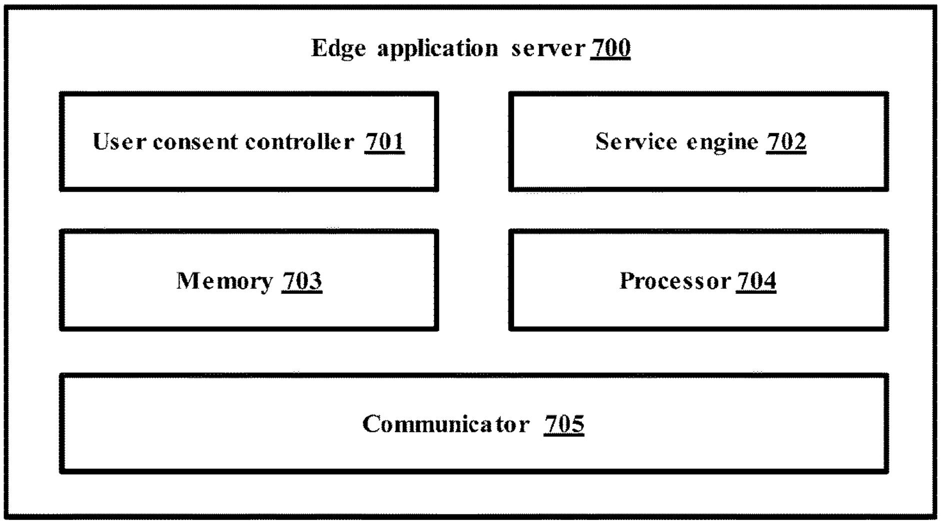
[Fig. 3]
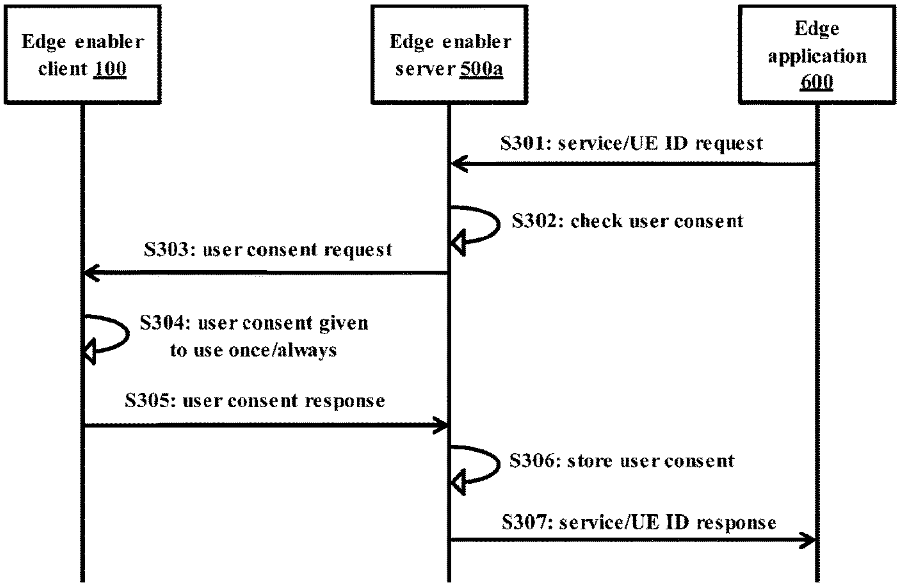
[Fig. 4]
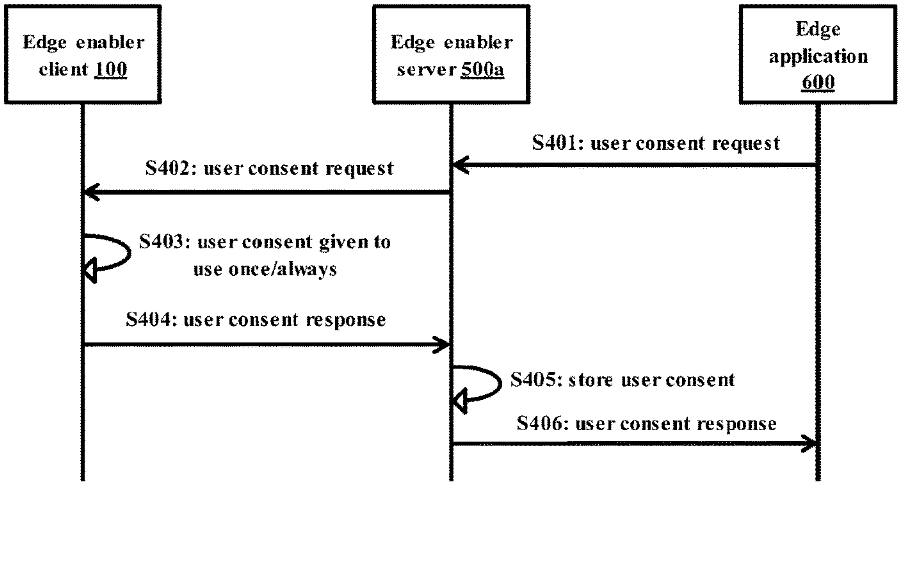

[Fig. 5]
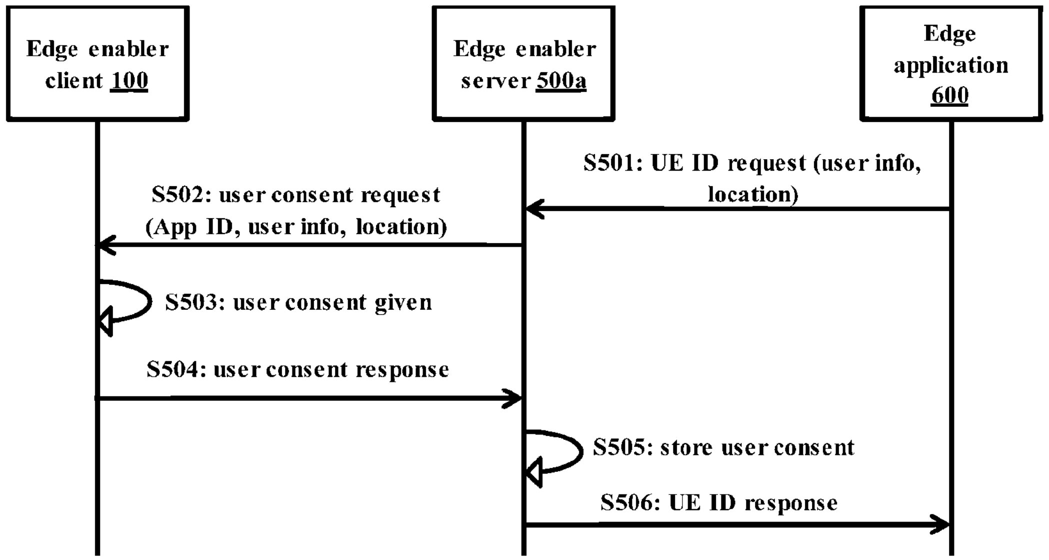
[Fig. 6]
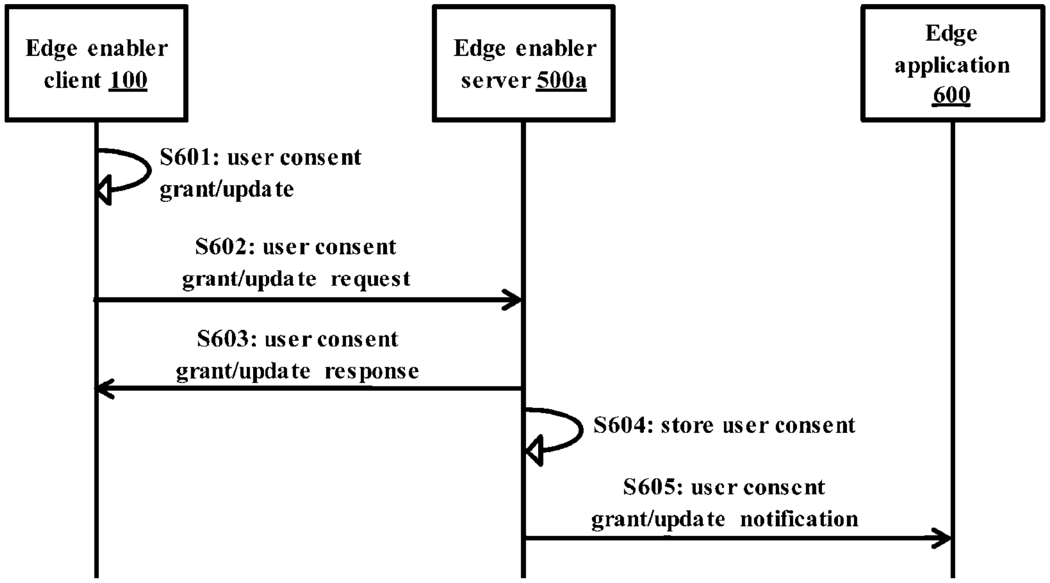

[Fig. 13]
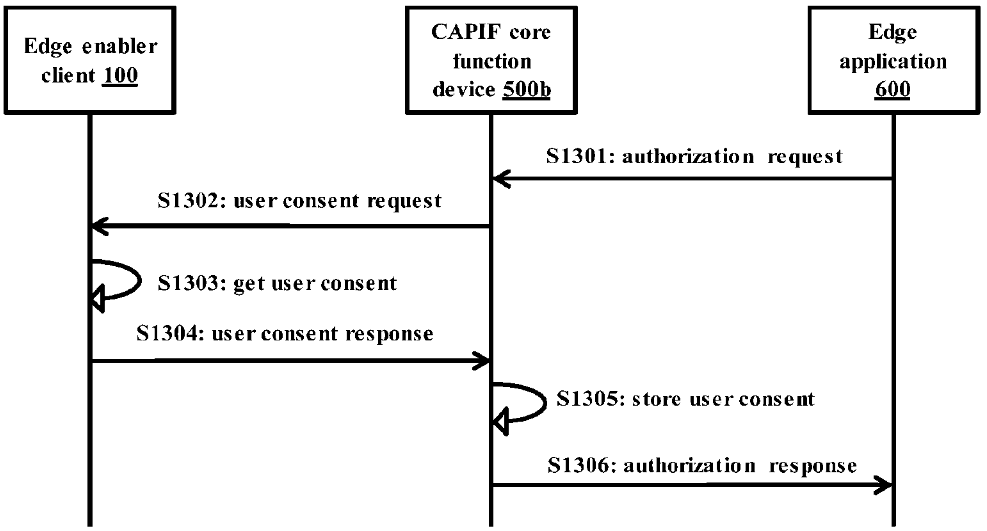
[Fig. 14]
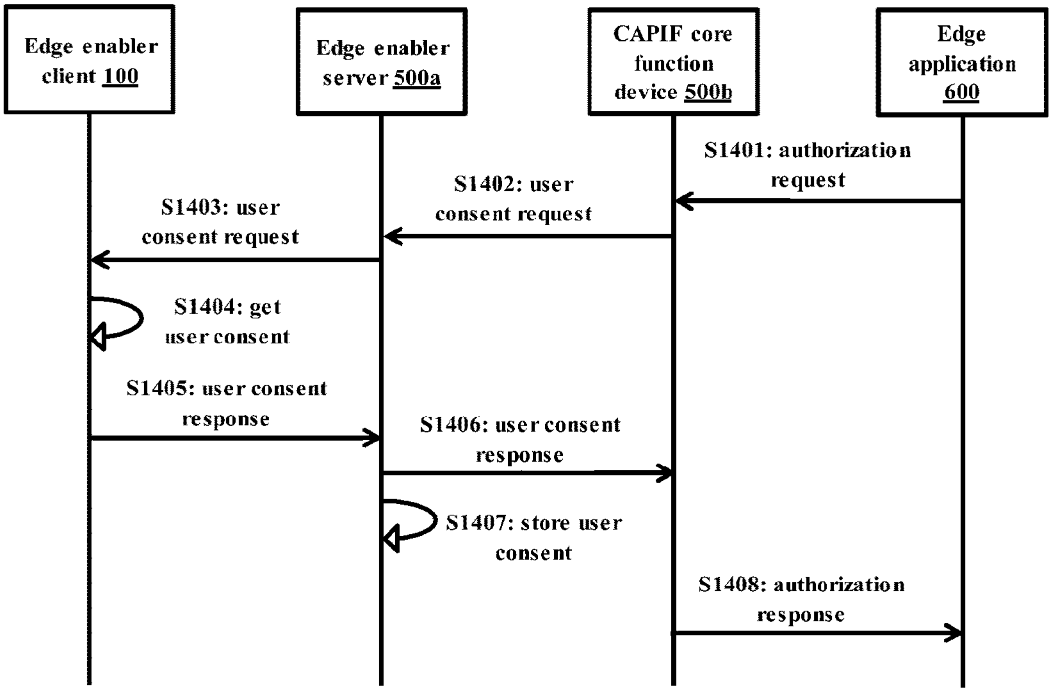

[Fig. 21]
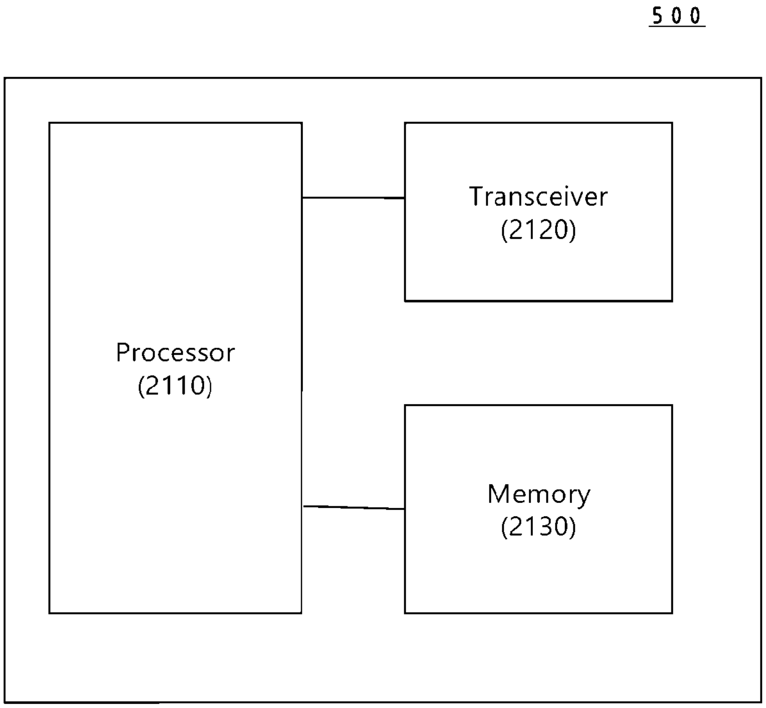
[Fig. 22]
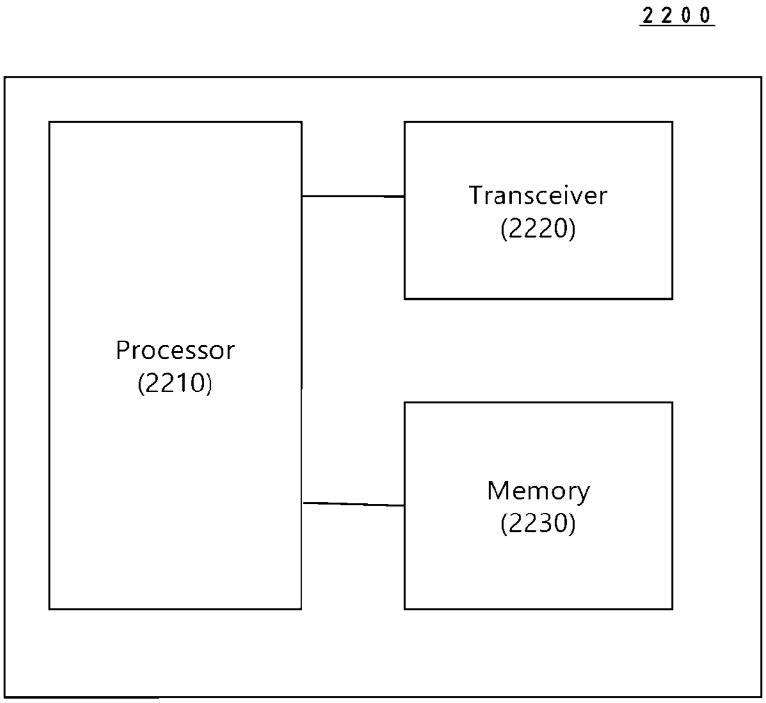

METHOD AND SERVER FOR PROVIDING USER CONSENT TO EDGE APPLICATION

PRIORITY

This application is a National Phase Entry of PCT International Application No. PCT/KR2020/007706 which was filed on Jun. 15, 2020, and claims priority to Indian Patent Application Nos. 201941023952 (PS) and 201941023952 (CS), which were filed on Jun. 17, 2019 and Jun. 3, 2020, respectively, the entire content of each of which is incorporated herein by reference.

TECHNICAL FIELD

Present disclosure relates to edge computing systems, and more specifically to a method and a system for providing a service to an edge application based on a user consent.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as as As technonologyed connectivity network where humans generate and consume information, is now evolving to the Internet of things (IoT) where ud server, has emeloT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem e principal object of the embodiments herein is to provide a method and a server for obtaining a user consent for providing a service to an edge application, where the service includes a network service, user specific information and device specific information.

Another object of the embodiments herein is to obtain a grant of the user consent from an authorized user for providing the service to the edge application, in response to receiving a request for accessing the service associated with a UE for a first time.

Another object of the embodiments herein is to store the user consent at a server user for a future usage of the user consent, in response to receiving the user consent.

Another object of the embodiments herein is to use the user consent stored at the server for providing the service to the edge application, in response to receiving the request for the service associated with the UE for a second time.

Another object of the embodiments herein is to allow the authorized user to modify the user consent stored at the server for controlling an exposure of the service with the edge application.

Another object of the embodiments herein is to provide private and sensitive information of the authorized user to only a legitimate edge application trusted by the authorized user.

BRIEF DESCRIPTION OF DRAWINGS

This method and apparatus are illustrated in the accompanying drawings, throughout which like reference letters indicate corresponding parts in the various figures. The embodiments herein will be better understood from the following description with reference to the drawings, in which:

FIG. 1 is a block diagram of a system for providing a service to an edge application of an edge data network, according to an embodiment as disclosed herein;

FIG. 2A-2H illustrates a block diagram of devices in the system for providing the service to the edge application, according to an embodiment as disclosed herein;

FIG. 3 is a sequential diagram illustrating signaling between the devices in the system for providing the service to the edge application in response to receiving a request for the service, according to an embodiment as disclosed herein;

FIG. 4 is a sequential diagram illustrating signaling between the devices in the system for providing the user consent to the edge application in response to receiving a request for a user consent, according to an embodiment as disclosed herein;

FIG. 5 is a sequential diagram illustrating signaling between the devices in the system for providing a User Equipment Identifier (UE ID) to the edge application in response to receiving a request for the UE ID, according to an embodiment as disclosed herein;

FIG. 6 is a sequential diagram illustrating signaling between the devices in the system for providing a user consent to the edge application in response to receiving the user consent voluntarily provided by a user, according to an embodiment as disclosed herein;

FIG. 13 is a sequential diagram illustrating signaling between the devices in the system for providing authorizing credentials to the edge application based on the user consent, according to an embodiment as disclosed herein;

FIG. 14 is a sequential diagram illustrating signaling between the devices in the system for providing the authorization credentials to the edge application based on the user consent obtained through the edge enabler server, according to an embodiment as disclosed herein;

FIG. 21 schematically illustrates the server according to embodiments of the present disclosure.

FIG. 22 illustrates a user equipment (UE) according to embodiments of the present disclosure.

BEST MODE FOR CARRYING OUT THE INVENTION

Figure 7:
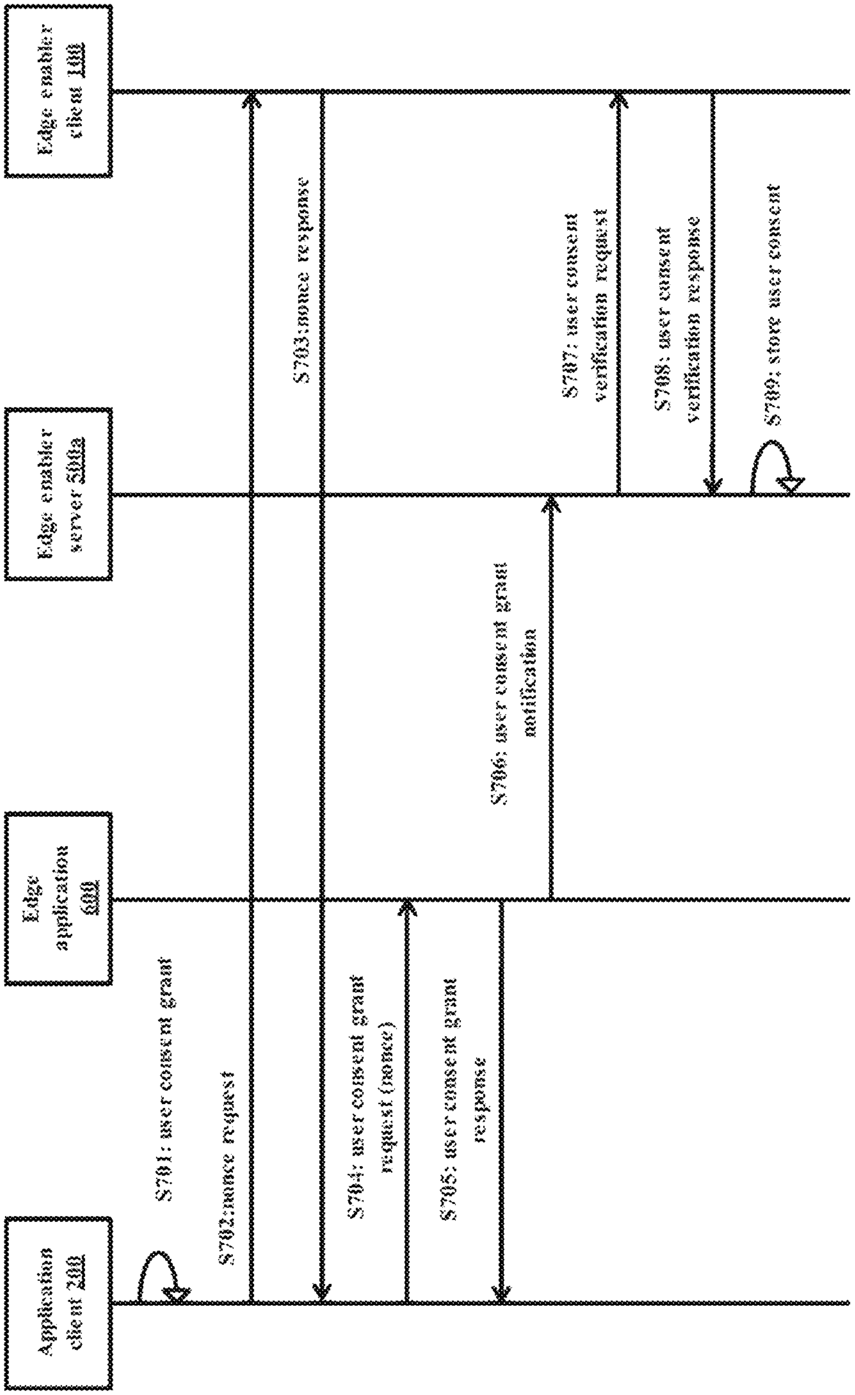
FIG. 7 is a sequential diagram illustrating signaling between the devices in the system for storing the user consent at an edge enabler server in response to receiving the user consent voluntarily provided by the user and verifying the user consent, according to an embodiment as disclosed herein.

The present disclosure provides a method and a server (or system) for providing a service to an edge application (600). The method for providing a service to an edge application (600) includes following steps of: receiving, by a server (500), a request for accessing at least one service associated with a UE (300) from the edge application (600); determining, by the server (500), availability of a user consent for accessing the at least one service requested by the edge application (600); and authorizing, by the server (500), access of the at least one service to the edge application (600) when the user consent is available.

In an embodiment, the method further comprising: sending, by the server (500), a user consent request to the UE (300) when the user consent for accessing the at least one service is not available at the server (500), wherein the user consent request indicates a request for the user consent; receiving, by the server (500), a user consent response comprising the user consent from the UE (300) for authorizing the access of the at least one service; and storing, by the server (500), the user consent, in response to receiving the user consent.

In an embodiment, the service associated with the UE (300) is a service associated with a user.

In an embodiment, the server (500) is one of an edge enabler server (500*a*) and a Common Application Program Interface Framework (CAPIF) core function device (500*b*).

In an embodiment, the method further comprising: receiving, by the server (500), a user consent update request from the edge enabler client (100), wherein the user consent update request comprises information about at least one parameter of the user consent to be updated; updating, by the server (500), the at least one parameter of the user consent stored at the server (500); and sending, by the server (500), a user consent update response to the edge enabler client (100).

In an embodiment, the method comprising: receiving, by the server (500), a user consent update request from an application client (200) through an edge application server (700), wherein the user consent update request comprises information about at least one parameter of the user consent to be updated; generating, by the server (500), an OTP for the user consent; sending, by the server (500), the OTP to the UE (300); receiving, by the server (500), a user consent update notification comprising the user consent and the OTP from one of the application client (200) through the edge application server (700) and the edge enabler client (100); verifying, by the server (500), the user consent based on the OTP; updating, by the server (500), the at least one parameter of the user consent stored at the server (500); and sending, by the server (500), a user consent response to the application client (200) through the edge application server (700).

Also, the method for providing a service to an edge application (600) includes following steps of: receiving, by a server (500), at least one of a request for accessing the service associated with a User Equipment (UE) (300) from the edge application (600), and a request for a user consent associated with the UE (300) from the edge application (600); retrieving, by the server (500), the user consent from the edge enabler client (100), wherein the user consent indicates a consent of a user of the edge enabler client (100) to provide at least one of the service and the user consent with the edge application (600); and sending, by the server (500), at least one of the service associated with the UE (300) and the user consent to the edge application (600).

In an embodiment, wherein the user consent sent to the edge application (600) is an authorization response.

In an embodiment, wherein retrieving, by the server (500), the user consent from the edge enabler client (100), comprising: determining, by the server (500), an availability of the user consent for accessing the requested service associated with the UE (300) by the edge application (600); and performing, by the server (500), one of: authorizing an access of the service to the edge application (600) when the user consent is available at the server (500), and sending a user consent request to the UE (300) when the user consent is not available at the server (500), and storing the user consent in response to receiving a user consent response comprising the user consent from the UE (300).

In an embodiment, wherein retrieving, by the server (500), the user consent from the edge enabler client (100), comprising: receiving, by the server (500), the request for the user consent associated with the UE (300) from an application client (200) through an edge application server (700); generating, by the server (500), a One Time Password (OTP) for the user consent; sending, by the server (500), the OTP to the UE (300); receiving, by the server (500), a user consent grant notification comprising the user consent and the OTP from one of the application client (200) through the edge application server (700) and the edge enabler client (100); verifying, by the server (500), the user consent based on the OTP; storing, by the server (500), the user consent; and sending, by the server (500), a user consent response to the application client (200) through the edge application server (700).

Also, the method for providing a service to an edge application (600) includes following steps of: receiving, by an edge enabler server (500*a*), a user consent grant notification from an application client (200), wherein the user consent grant notification comprises a user consent to provide the service associated with a User Equipment (UE) (300) with the edge application (600); and storing, by the edge enabler server (500*a*), the user consent for providing at least one of the service and the user consent to the edge application (600);

In an embodiment, wherein receiving, by the edge enabler server (500*a*), the user consent grant notification from the application client (200), comprising: receiving, by the application client (200), the user consent from a user; sending, by the application client (200), a request for a nonce to the edge enabler client (100); receiving, by the application client (200), the nonce from the edge enabler client (100); sending, by the application client (200), the user consent grant notification to the edge enabler server (500*a*) through the edge application (600), wherein the user consent grant notification includes the user consent and the nonce; and verifying, by the edge enabler server (500*a*), the user consent with the edge enabler client (100) based on the nonce.

In an embodiment, the method further comprising: receiving, by the edge enabler server (500*a*), a user consent update request from the application client (200), wherein the user consent update request comprises information about at least one parameter of the user consent to be updated; updating, by the edge enabler server (500*a*), the at least one parameter of the user consent stored at the edge enabler server (500*a*); and sending, by the edge enabler server (500*a*), a user consent update response to the application client (200).

Also, the method for providing a service to an edge application (600) includes following steps of: receiving, by an application client (200), an application specific user information for providing the service associated with a User Equipment (UE) (300) to the edge application (600); sending, by the application client (200), the application specific user information to the edge application (600) and the edge enabler client (100); receiving, by the edge enabler client (100), a user consent to provide the service associated with the UE (300) to the edge application (600), in response to receiving the application specific user information; sending, by the edge enabler client (100), the application specific user information with the user consent to the edge enabler server (500*a*); storing, by the edge enabler server (500*a*), the application specific user information and the user consent; receiving, by the edge enabler server (500*a*), a request for the service comprising the application specific user information from the edge application (600); verifying, by the edge enabler server (500*a*), the user consent based on the application specific user information; and sending, by the edge enabler server (500*a*), the service associated with the UE (300) to the edge application (600).

Also, the method for providing a service to an edge application (600) includes following steps of: sending, by the edge application (600), an authorization request to a Common Application Program Interface Framework (CAPIF) core function device (500*b*) for receiving the service associated with a User Equipment (UE) (300); sending, by the edge application (600), a request for the service associated with the UE (300) to an edge enabler server (500*a*), in response to successfully authorized by the CAPIF core function device (500*b*); sending, by the edge enabler server (500*a*), a request for credentials to the CAPIF core function device (500*b*); sending, by the CAPIF core function device (500*b*), a user consent request to the edge enabler client (100) for receiving a user consent to provide the service to the edge application (600); receiving, by the CAPIF core function device (500*b*), the user consent from the edge enabler client (100); sending, by the CAPIF core function device (500*b*), credentials to the edge enabler server (500*a*) based on the user consent; and sending, by the edge enabler server (500*a*), the service to the edge application (600).

Also, the method for providing a service to an edge application (600) includes following steps of: receiving, by a User Equipment (UE) (300) a user consent to provide the service associated with the UE (300) to the edge application (600); sending, by the UE (300), a user consent grant notification to a core network (400), wherein the user consent grant notification comprises the user consent to provide the service with the edge application (600); storing, by the core network (400), the user consent in response to receiving the user consent grant notification from the UE (300); notifying, by the core network (400), an availability of the user consent to an edge enabler server (500*a*); receiving, by the edge enabler server (500*a*), a request for the service from an edge application server (700); retrieving, by the edge enabler server (500*a*), the user consent from the core network (400); storing, by the edge enabler server (500*a*); the user consent; and sending, by the edge enabler server (500*a*); a response for the service associated with the UE (300) to the edge application server (700) based on the user consent.

Also, the method for providing a service to an edge application (600) includes following steps of: receiving, by an edge enabler server (500*a*), a request for the service associated with a User Equipment (UE) (300) from an edge application server (700); sending, by the edge enabler server (500*a*), a user consent request to a core network (400) wherein the user consent request indicates a request for the user consent; sending, by the core network (400), the user consent request to the UE (300); receiving, by the UE (300), the user consent to provide the service with the edge application (600); sending, by the UE (300), a user consent response to the core network (400), wherein the user consent response comprises the user consent to provide the service with the edge application (600); storing, by the core network (400), the user consent in response to receiving the user consent response from the UE (300); sending, by the core network (400), the user consent response to the edge enabler server (500*a*); storing, by the edge enabler server (500*a*); the user consent in response to receiving the user consent response from the core network (400); and sending, by the edge enabler server (500*a*) a response for the service associated with the UE (300) to the edge application server (700) based on the user consent.

Also, the system (1000) for providing a service to an edge application (600) in a network, comprising: an edge enabler client (100); an application client (200); a User Equipment (UE) (300); a server (500); the edge application (600); and an edge application server (700), wherein the server (500) is configured to: receive a request for accessing at least one service associated with a UE (300) from the edge application (600); determine availability of a user consent for accessing the at least one service requested by the edge application (600); and authorize access of the at least one service to the edge application (600) when the user consent is available.

Also, the system (1000) for providing a service to an edge application (600), comprising: an edge enabler client (100); an application client (200); a User Equipment UE (300); a server (500); the edge application (600); and an edge application server (700), wherein the server (500) is configured to: receive at least one of a request for accessing the service associated with the UE (300) from the edge application (600), and a request for a user consent associated with the UE (300) from the edge application (600), retrieve the user consent from the edge enabler client (100), wherein the user consent indicates a consent of a user of the edge enabler client (100) to provide at least one of the service and the user consent with the edge application (600), and send at least one of the service associated with the UE (300) and the user consent to the edge application (600).

Also, the system (1000) for providing a service to an edge application (600), comprising: an edge enabler client (100); an application client (200); a User Equipment (UE) (300); an edge enabler server (500*a*); and the edge application (600), wherein the edge enabler server (500*a*) is configured to: receive a user consent grant notification from the application client (200), wherein the user consent grant notification comprises a user consent to provide the service associated with the UE (300) with the edge application (600), store the user consent for providing at least one of the service and the user consent to the edge application (600).

Also, the system (1000) for providing a service to an edge application (600), comprising: an edge enabler client (100); an application client (200); a User Equipment (UE) (300); an edge enabler server (500*a*); and the edge application (600), wherein the application client (200) is configured to: receive an application specific user information for providing the service associated with the UE (300) to the edge application (600), and send the application specific user information to the edge application (600) and the edge enabler client (100), wherein the edge enabler client (100) is configured to: receive a user consent to provide the service associated with the UE (300) to the edge application (600), in response to receiving the application specific user information from the application client (200), and send the application specific user information and the user consent to the edge enabler server (500*a*), wherein the edge enabler server (500*a*) is configured to: store the application specific user information and the user consent, receive a request for the service comprising the application specific user information from the edge application (600), verify the user consent based on the application specific user information, and send the service associated with the UE (300) to the edge application (600).

Also, the system (1000) for providing a service to an edge application (600), comprising: an edge enabler client (100); a User Equipment (UE) (300); an edge enabler server (500*a*); a Common Application Program Interface Framework (CAPIF) core function device (500*b*); and the edge application (600), wherein the edge application (600) is configured to: send an authorization request to the CAPIF core function device (500*b*) for receiving the service associated with the UE (300), and send a request for the service associated with the UE (300) to the edge enabler server (500*a*) in response to successfully authorized by the CAPIF core function device (500*b*), wherein the edge enabler server (500*a*) is configured to: send a request for credentials to the CAPIF core function device (500*b*) in response to receiving the request for the service from the edge application (600), and send the service to the edge application (600) in response to receiving the credentials from the CAPIF core function device (500*b*), wherein the CAPIF core function device (500*b*) configured to: send a user consent request to the edge enabler client (100) for receiving a user consent to provide the service to the edge application (600) in response to receiving the request for the credentials from the edge enabler server (500*a*), receive the user consent from the edge enabler client (100), and send the credentials to the edge enabler server (500*a*) based on the user consent.

Also, the system (1000) for providing a service to an edge application (600), comprising: a User Equipment (UE) (300); a core network (400); an edge enabler server (500*a*); the edge application (600); and an edge application server (700), wherein the UE (300) is configured to: receive a user consent to provide the service associated with the UE (300) to the edge application (600), and send a user consent grant notification to the core network (400), wherein the user consent grant notification comprises the user consent to provide the service with the edge application (600), wherein the core network (400) is configured to: store the user consent in response to receiving the user consent grant notification from the UE (300), and notify an availability of the user consent to the edge enabler server (500*a*), wherein the edge enabler server (500*a*) is configured to: receive a request for the service from the edge application server (700), retrieve the user consent from the core network (400), store the user consent, and send a response for the service associated with the UE (300) to the edge application server (700) based on the user consent.

Also, the system (1000) for providing a service to an edge application (600), comprising: a User Equipment (UE) (300); a core network (400); an edge enabler server (500*a*); the edge application (600); and an edge application server (700), wherein the edge enabler server (500*a*) is configured to: receive a request for the service associated with the UE (300) from the edge application server (700), send a user consent request to the core network (400) wherein the user consent request indicates a request for the user consent, store the user consent in response to receiving the user consent response from the core network (400), and send a response for the service associated with the UE (300) to the edge application server (700) based on the user consent, wherein the core network (400) is configured to: send the user consent request to the UE (300) in response to receiving the user consent request from the edge enabler server (500*a*), store the user consent in response to receiving the user consent response from the UE (300), and send the user consent response to the edge enabler server (500*a*), wherein the UE (300) is configured to: receive the user consent to provide the service with the edge application (600) in response to receiving the user consent request from the core network (400), and send a user consent response to the core network (400), wherein the user consent response comprises the user consent to provide the service with the edge application (600).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Prior to describing the embodiments in detail, the following definitions are described for better understanding of the embodiments of the present disclosure.

An edge computing system includes edge data network connected to a User Equipment (UE) as per the 3rd Generation Partnership Project (3GPP) specifications. An edge enabler server of the edge data network caters to the edge applications running at an edge data network and edge enabler clients running at the UE. The edge enabler server is configured to provide a network service (e.g. location service), user specific information (e.g. name, age, contact number, etc. of a user) and device specific information (e.g. UE identifier) to the edge applications by exposing corresponding 3GPP network service Application Program Interfaces (APIs) of the network service to the edge applications. Capabilities of the edge systems allow the edge applications to request the edge enabler server for invoking the network service. In response to receiving the request, the edge enabler server invokes a relevant service APIs and shares invocation results such as a location information of the UE back to the edge applications.

However, the edge enabler server does not obtain consent of the user to provide the network service and the information to the edge applications. Therefore, private and sensitive information of the user reaches to even an untrusted edge application in the edge data network without knowing by the user, which is a potential threat for a data security and privacy of the user. Hence, an approval of the user is desired for providing the network service, particular device specific information and a user specific information to the edge applications. Further, the approval of the user is also desired to modify and update whenever necessary to revoke privileges of the edge applications. Thus, it is desired to address the above-mentioned shortcomings or at least provide a useful alternative.

Accordingly, the embodiments herein provide a method for providing a service to an edge application. The method includes receiving, by a server, at least one of a request for accessing the service associated with a UE from the edge application, and a request for a user consent associated with the UE from the edge application. Further, the method includes retrieving, by the server, the user consent from the edge enabler client, where the user consent indicates a consent of a user of the edge enabler client to provide at least one of the service and the user consent with the edge application. Further, the method includes providing, by the server, at least one of the service associated with the UE and the user consent to the edge application.

Unlike existing methods and systems, the proposed system is configured to request the user to grant the consent for providing the service such as a geolocation service, a device specific information (e.g. UE ID), user specific information (e.g. a contact number of the user) etc. to the edge application. Therefore, private and sensitive information of the user and the UE are not exposing to the edge application without a permission of the user. Alternatively, the proposed system allows the user to voluntarily provide the consent for providing the service to the edge application. Additionally, the proposed system allows the user to update the consent and set limits for restricting privileges of the edge application to access the service. Thus, the proposed system enhances a user experience, data security and a privacy of the user.

Referring now to the drawings, and more particularly to FIGS. 1 through 20, there are shown preferred embodiments.

FIG. 1 is a block diagram of a system 1000 for providing a service to an edge application 600 of an edge data network, according to an embodiment as disclosed herein. Examples for the service includes at least one of a location information of the UE 300, a device specific information (e.g. a UE identifier), a service identifier, user information (i.e. a user specific information), authorization credentials, etc. Example for the user information is a user profile ID in an application, personal details of the user, etc. In an embodiment, the system 1000 includes an edge enabler client 100, an application client 200, a UE 300, a core network 400, a server 500, the edge application 600 and an edge application server 700. In an embodiment, the server 500 is an edge enabler server 500*a* (shown in FIG. 2E) or a CAPIF core function device 500*b* (shown in FIG. 2F). In an embodiment, the edge enabler client 100 and the application client 200 are components of the UE 300. In an embodiment, the edge application 600 is operating in a device.

The server 500 is configured to receive a request for the service associated with the UE 300 from the edge application 600 or a request for obtaining a user consent associated with the UE 300 from the edge application 600. In an embodiment, the service associated with the UE is a service associated with a user. In an embodiment, the request for the service associated with the UE 300 is a request for accessing the service associated with the UE 300. In an embodiment, the request for obtaining the user consent includes the service requested by the edge application 600 and information about the edge application 600, such as an application ID. In an embodiment, the request for obtaining the user consent includes details of the services needed for the edge application 600. In an embodiment, the request for obtaining the user consent is clubbed with a registration request of the edge application 600 to register on the edge enabler server 500*a*. In an embodiment, the request for the service includes the application specific user information and the service that required for the edge enabler server 500*a*. In an embodiment, the user consent indicates a consent of the user of the edge enabler client 100 to share at least the service or the user consent with the edge application 600.

In response to receiving the request for the service or the request for the user consent, the server 500 is configured to check whether the user consent is available at the server 500. When the user consent is available at the server 500, the server 500 is configured to provide at least the service associated with the UE 300 or the user consent to the edge application 600. In an embodiment, the server 500 is configured to send the service to the edge application 600 for providing the service to the edge application 600. In an embodiment, the server 500 is configured to send the user consent to the edge application 600 for providing the user consent to the edge application 600. In an embodiment, when the user consent is available at the server 500, the server 500 is configured to perform authorization to send an authorization response as the user consent to the edge application 600.

When the user consent is not available at the server 500, the server 500 is configured to retrieve the user consent from the edge enabler client 100. In an embodiment, the server 500 is configured to send a user consent request to the edge enabler client 100 of the UE (300) for retrieving the user consent, where the user consent request indicates the request for the user consent. In an embodiment, the user consent request includes the information about the edge application 600 such as the application ID, and the service for which the user consent is requested by the edge application 600. Further, the server 500 is configured to receive a user consent response includes the user consent from the edge enabler client 100 by authorizing the access of the service. In an embodiment, the edge enabler client 100 is configured to request the user to provide the consent for providing the service to the edge application 600, in response to receiving the user consent request.

The edge enabler client 100 is configured to share the user consent to the server 500, in response to receiving the consent from the user for providing the service to the edge application 600. In an embodiment, the edge enabler client 100 is configured to authorize the user using the any of, but not limited to biometrics, passwords, Personal Identification Number (PIN), pattern lock, etc. for accepting a grant/update of the user consent. In an embodiment, the user provides the consent to the edge application 600 to avail the service to the edge application 600 for once or always or a limited number of times or a time-bound or a location (such as geo-location) bound. The server 500 is configured to store the user consent, in response to receiving the user consent from the UE 300. Further, the server 500 is configured to provide at least the service associated with the UE 300 or the user consent to the edge application 600. In an embodiment, the user consent sent to the edge application 600 is an authorization response.

In another embodiment, the server 500 is configured to determine availability of the user consent for accessing the service requested by the edge application 600, in response to receiving the request for the service or the user consent from the edge application 600. The server 500 is configured to authorize access of the service to the edge application 600 when the user consent is available. The server 500 is configured to authorize access of the service to the edge application 600 when the user consent is available. The server 500 is configured to send the user consent request to the UE 300 when the user consent for accessing the at least one service is not available at the server 500. The server 500 is configured to receive a user consent response including the user consent from the UE 300 for authorizing the access of the at least one service. The server 500 is configured to store the user consent, in response to receiving the user consent.

In an embodiment, the server 500 is configured to receive a user consent update request from the edge enabler client 100 after storing the user consent. The user voluntarily provides an updated user consent to the edge enabler client 100 for sending the user consent update request to the server 500. The user consent update request includes information about at least one parameter of the user consent to be updated. Examples for the parameter of the user consent are the number of times the user consent is allowed to use, a time-bound or a location (such as geo-location) bound, etc. Further, the server 500 is configured update the at least one parameter of the user consent stored at the server 500. The server 500 is configured send a user consent update response to the edge enabler client 100, in response to updating the at least one parameter of the user consent.

In another embodiment, the server 500 is configured to receive the request for the user consent associated with the UE 300 from the application client 200 through the edge application server 700. Further, the server 500 is configured to generate an OTP for the user consent. Further, the server 500 is configured to send the OTP to the UE 300. In an embodiment, the server 500 choose a channel of sharing the OTP to the UE 300 based on user contact information such as a mobile number, email address, etc. available at the server 500. In an embodiment, the application client 200 configured to request the user to input the OTP in the consent. The server 500 is configured to receive a user consent grant notification includes the user consent and the OTP from the application client 200 through the edge application server 700 or the edge enabler client 100 for retrieving the user consent from the edge enabler client 100. Further, the server 500 is configured to verify the user consent based on the OTP. Further, the server 500 is configured to store the user consent. Further, the server 500 is configured to send a user consent response to the application client 200 through the edge application server 700.

In an embodiment, the server 500 is configured to receive the user consent update request from the application client 200 through the edge application server 700 after storing the user consent. The user consent update request includes information about at least one parameter of the user consent to be updated. Further, the server 500 is configured to generate an OTP for the user consent. Further, the server 500 is configured to send the OTP to the UE 300. Further, the server 500 is configured to receive a user consent update notification includes the user consent and the OTP from one of the application client 200 through the edge application server 700 and the edge enabler client 100. Further, the server 500 is configured to verify the user consent based on the OTP. Further, the server 500 is configured to update the at least one parameter of the user consent stored at the server 500. Further, the server 500 is configured to send the user consent update response to the application client 200 through the edge application server 700.

In another embodiment, the edge enabler server **500*a* is configured to receive the user consent grant notification from the application client 200. In an embodiment, the user consent grant notification includes the user consent to provide the service associated with the UE 300 with the edge application 600. The edge enabler server 500*a* is configured to store the user consent for a future usage purpose. The edge enabler server 500*a* is configured to use the user consent for providing at least one of the service and the user consent to the edge application 600 whenever the edge enabler server 500*a* receives the request for the service or the user consent from the edge application 600**.

In an embodiment, the edge enabler server **500*a* is configured to receive the user consent update request from the application client 200 after storing the user consent. The user voluntarily provides the updated user consent to the application client 200 for sending the user consent update request to the edge enabler server 500*a*. Further, the edge enabler server 500*a* is configured to update the at least one parameter of the user consent stored at the edge enabler server 500*a*. Further, the edge enabler server 500*a* is configured to send the user consent update response to the application client 200**.

In another embodiment, the application client 200 is configured to receive the user consent from the user, where the user voluntarily provides the user consent to the application client 200. Further, the application client 200 is configured to send a request for a nonce to the edge enabler client 100. In an embodiment, the request for the nonce can be the request for a voucher or a request for a token. Further, the edge enabler client 100 is configured to send the nonce/voucher/token to the application client 200. The application client 200 is configured to send the user consent grant notification to the edge enabler server **500*a* through the edge application 600 in response to receiving the nonce/voucher/token from the edge enabler client 100. In an embodiment, the user consent grant notification includes the user consent and the nonce/voucher/token. Further, the edge enabler server 500*a* is configured to verify the user consent with the edge enabler client 100 based on the nonce. Further, the edge enabler server 500*a* is configured to store the user consent for the future usage purpose. The edge enabler server 500*a* is configured to use the user consent for providing at least one of the service and the user consent to the edge application 600 whenever the edge enabler server 500*a* receives the request for the service or the user consent from the edge application 600**.

In another embodiment, the application client 200 is configured to receive an application specific user information for providing the service to the edge application 600. Further, the application client 200 is configured to send the application specific user information to the edge application 600 and the edge enabler client 100. Further, the edge enabler client 100 is configured to receive the user consent to provide the service associated with the UE 300 to the edge application 600, in response to receiving the application specific user information from the application client 200. Further, the edge enabler client 100 is configured to send the application specific user information and the user consent to the edge enabler server **500*a*. Further, the edge enabler server 500*a* is configured to store the application specific user information and the user consent. Further, the edge enabler server 500*a* is configured to receive the request for the service including the application specific user information from the edge application 600. Further, the edge enabler server 500*a* is configured to verify the user consent based on the application specific user information. Further, the edge enabler server 500*a* is configured to provide the service associated with the UE 300 to the edge application 600**.

The CAPIF core function device **500*b* operates as an authority to generate authorization for the edge application 600. In an embodiment, the edge application 600 operates as an API invoker and the edge enabler server 500*a* operates as an API exposing function. In an embodiment, when the edge application 600 has direct access to the network services, then network entities providing the service operates as the API exposing function. In an embodiment, the CAPIF core function device 500***b* is directly interfaced with the edge enabler client 100 to obtain the user consent or via the edge enabler server 500*a*.

In another embodiment, the edge application 600 is configured to send a request for performing authorization to the CAPIF core function device 500*b* for receiving the service associated with the UE 300. Further, the CAPIF core function device 500*b* is configured to perform authorization and generate a Pre-shared Key (PSK). Further, the CAPIF core function device 500*b* is configured to send the PSK to the edge application 600. The edge application 600 is configured to send the request for the service associated with the UE 300 to the edge enabler server 500*a* in response to successfully authorized by the CAPIF core function device 500*b*. Further, the edge enabler server 500*a* is configured to send a request for the credentials to the CAPIF core function device 500*b* in response to receiving the request for the service from the edge application 600. Further, the CAPIF core function device 500*b* is configured to send the user consent request to the edge enabler client 100 for receiving the user consent to provide the service. Further, the edge enabler client 100 is configured to obtain the user consent. Further, the edge enabler client 100 is configured to send the user consent to the CAPIF core function device 500*b*. The CAPIF core function device 500*b* is configured to send the credentials to the edge enabler server 500*a* based on the user consent, in response to receiving the user consent. The edge enabler server 500*a* is configured to provide the service to the edge application 600 in response to receiving the credentials from the CAPIF core function device 500*b*.

In another embodiment, the UE 300 is configured to receive the user consent voluntarily from the user to provide the service associated with the UE 300 to the edge application 600. The UE 300 is configured to send the user consent grant notification to the core network 400. Further, the core network 400 is configured to store the user consent in response to receiving the user consent grant notification from the UE 300. Further, the core network 400 is configured to notify an availability of the user consent to the edge enabler server 500*a*. Further, the edge enabler server 500*a* is configured to receive the request for the service from the edge application server 700. The edge enabler server 500*a* is configured to retrieve the user consent from the core network 400, in response to receiving the request for the service. Further, the edge enabler server 500*a* is configured to store the user consent. Further, the edge enabler server 500*a* is configured to send the response for the service associated with the UE 300 to the edge application server 700 based on the user consent.

In another embodiment, the edge enabler server 500*a* is configured to receive the request for the service associated with the UE 300 from the edge application server 700. Further, the edge enabler server 500*a* is configured to send the user consent request to the core network 400 where the user consent request indicates the request for the user consent. Further, the core network 400 is configured to. send the user consent request to the UE 300 in response to receiving the user consent request from the edge enabler server 500*a*. Further, the UE 300 is configured to receive the user consent from the user to provide the service with the edge application 600, in response to receiving the user consent request from the core network 400. The UE 300 is configured to send a user consent response to the core network 400, where the user consent response includes the user consent to provide the service with the edge application 600. The core network 400 is configured to store the user consent in response to receiving the user consent response from the UE 300. Further, the core network 400 is configured to send the user consent response to the edge enabler server 500*a*. The edge enabler server 500*a* is configured to store the user consent in response to receiving the user consent response from the core network 400. Further, the edge enabler server 500*a* is configured to send the response for the service associated with the UE 300 to the edge application server 700 based on the user consent.

In an embodiment, the edge enabler client 100, or an entity in the system 1000 requests for consolidated user consents for similar services to the user for optimize a number of consents taken from the user. For example, while taking the user consent for an on-device or device generated user location, the entity clubs the user consent for the location service of the edge.

Although figure in the FIG. 1 shows the components in the system 1000 but it is to be understood that other embodiments are not limited thereon. In other embodiments, the system 1000 may include less or more number of components. Further, the labels or names of the components are used only for illustrative purpose and does not limit the scope of the invention. One or more components can be combined together to perform same or substantially similar function for providing the service to the edge application 600.

FIG. 2A-2H illustrates a block diagram of devices in the system 1000 for providing the service to the edge application 600, according to an embodiment as disclosed herein.

The block diagram of the edge enabler client 100 is shown in the FIG. 2A. In an embodiment, the edge enabler client 100 includes a user consent controller 101, a nonce generator 102, a memory 103, a processor 104, and a communicator 105, where the processor 104 is coupled to the memory 103. The user consent controller 101 requests the user to provide the consent for providing the service to the edge application 600, in response to receiving the user consent request. The user consent controller 101 authorizes the user using the any of, but not limited to biometrics, passwords, PIN, pattern lock, etc. for accepting a grant/update of the user consent. The user consent controller 101 receives the user consent to provide the service associated with the UE 300 to the edge application 600, in response to receiving the application specific user information from the application client 200. The user consent controller 101 sends the application specific user information and the user consent to the edge enabler server 500*a*. In an embodiment, the user consent controller 101 obtains the user consent and sends the user consent to the CAPIF core function device 500*b*. The nonce generator 102 sends the nonce/voucher/token to the application client 200.

The processor 104 is configured to execute instructions stored in the memory 103. The memory 103 may include non-volatile storage elements. Examples of such nonvolatile storage elements may include magnetic hard discs, optical discs, floppy discs, flash memories, or forms of an Electrically Programmable Memory (EPROM) or an Electrically Erasable and Programmable Memory (EEPROM). In addition, the memory 103 may, in some examples, be considered a non-transitory storage medium. The term "non-transitory" may indicate that the storage medium is not embodied in a carrier wave or a propagated signal. However, the term "non-transitory" should not be interpreted that the memory 103 is non-movable. In some examples, the memory 103 can be configured to store larger amounts of information than the memory 103. In certain examples, a non-transitory storage medium may store data that can, over time, change (e.g., in Random Access Memory (RAM) or cache). The communicator 105 is configured to communicate internally between hardware components in the edge enabler client 100. Further, the communicator 105 is configured to facilitate the communication between the edge enabler client 100 and other devices in the system 1000.

The block diagram of the application client 200, is shown in the FIG. 2B. In an embodiment, the application client 200 includes a user consent controller 201, a service engine 202, a memory 203, a processor 204, and a communicator 205, where the processor 204 is coupled to the memory 203. The user consent controller 201 receives the user consent from the user, where the user voluntarily provides the user consent to the application client 200. The user consent controller 201 sends the request for the nonce to the edge enabler client 100. The user consent controller 201 sends the user consent grant notification to the edge enabler server 500*a* through the edge application 600 in response to receiving the nonce/voucher/token from the edge enabler client 100. The service engine 202 receives the application specific user information for providing the service to the edge application 600. The service engine 202 sends the application specific user information to the edge application 600 and the edge enabler client 100. The user consent controller 201 requests the user to input the OTP in the consent. The memory 203, the processor 204, and the communicator 205 operates similar as the memory 103, the processor 104, and the communicator 105 respectively for reliable functioning of the application client 200.

The block diagram of the UE 300, is shown in the FIG. 2C. In an embodiment, the UE 300 includes the Edge Enabler Client (EEC) 100, the Application Client (AC) 200, a Non-Access Stratum layer (NAS) 301, a memory 302, a processor 303, and a communicator 304, where the processor 303 is coupled to the memory 302. The edge enabler client 100 or the NAS 301 obtains the user consent voluntarily from the user to provide the service associated with the UE 300 to the edge application 600. The NAS 303 sends the user consent grant notification to the core network 400. The NAS 303 obtains the user consent from the user to provide the service with the edge application 600, in response to receiving the user consent request from the core network 400. The memory 302, the processor 303, and the communicator 304 operates similar as the memory 103, the processor 104, and the communicator 105 respectively for reliable functioning of the UE 300.

In an embodiment, the NAS 303 updates the use consent to the core network 400 (e.g. 5G core network) based on the request from the edge application server 700 or the application client 200. Therefore, the edge enabler server 500*a* obtains the user consent in an authorized way. In an embodiment, the edge application server 700 triggers the application client 200 to initiate steps for obtaining the user consent. Therefore, an updated user consent is fetched from the edge enabler server 500*a*.

The block diagram of the core network 400, is shown in the FIG. 2D. In an embodiment, the core network 400 includes an AMF 401, a PCF 402, a UDM/UDR 403, a memory 404, a processor 405, and a communicator 406, where the processor 405 is coupled to the memory 404. The AMF 401 receives the user consent form the UE 300. The PCF 402 or the UDM/UDR 403 notifies the availability of the user consent to the edge enabler server 500*a*, in response to storing the user consent to the memory 404. The PCF 402 or the UDM/UDR sends the user consent request to the UE 300 in response to receiving the user consent request from the edge enabler server 500*a*. The PCF 402 or the UDM/UDR sends the user consent response to the edge enabler server 500*a*, in response to storing the user consent to the memory 404. In an embodiment, the memory 404 stores the user consent, in response to receiving the user consent at the PCF 402 or the UDM/UDR 403. The memory 404 the processor 405, and the communicator 406 operates similar as the memory 103, the processor 104, and the communicator 105 respectively for reliable functioning of the core network 400.

The block diagram of the edge enabler server 500*a*, is shown in the FIG. 2E. In an embodiment, the edge enabler server 500*a* includes a user consent controller 501*a*, a service engine 502*a*, a memory 503*a*, a processor 504*a*, and a communicator 505*a*, where the processor 504*a* is coupled to the memory 503*a*.

The user consent controller 501*a* receives the request for obtaining a user consent associated with the UE 300 from the edge application 600. In response to receiving the request for the service or the request for the user consent, the user consent controller 501*a* is checks whether the user consent is available at the edge enabler server 500*a*. When the user consent is available at the edge enabler server 500*a*, the user consent controller 501*a* sends the user consent to the edge application 600. When the user consent is not available at the edge enabler server 500*a*, the user consent controller 501*a* retrieves the user consent from the edge enabler client 100. In an embodiment, the user consent controller 501*a* sends the user consent request to the edge enabler client 100 for retrieving the user consent.

The user consent controller 501*a* receives a user consent response includes the user consent from the edge enabler client 100. The user consent controller 501*a* sends the user consent to the edge application 600, in response to receiving or storing the user consent at the edge enabler server 500*a*. The user consent controller 501*a* receives a user consent update request from the edge enabler client 100 after storing the user consent. The user consent controller 501*a* updates the at least one parameter of the user consent stored at the server 500, in response to receiving an updated user consent. The user consent controller 501*a* sends the user consent update response to the edge enabler client 100, in response to updating the at least one parameter of the user consent.

In an embodiment, the user consent controller 501*a* receives the request for the user consent associated with the UE 300 from the application client 200 through the edge application server 700. Further, the user consent controller 501*a* generates the OTP for the user consent. Further, the user consent controller 501*a* sends the OTP to the UE 300. In an embodiment, the user consent controller 501*a* chooses the channel of sharing the OTP to the UE 300 based on the user contact information such as the mobile number, the email address, etc. available at the edge enabler server 500*a*. The user consent controller 501*a* receives the user consent grant notification includes the user consent and the OTP from the application client 200 through the edge application server 700 or the edge enabler client 100 for retrieving the user consent from the edge enabler client 100. The user consent controller 501*a* verifies the user consent based on the OTP. The user consent controller 501*a* sends the user consent response to the application client 200 through the edge application server 700.

In an embodiment, the user consent controller 501*a* receives the user consent update request from the application client 200 through the edge application server 700 after storing the user consent. Further, the user consent controller 501*a* generates the OTP for the user consent. Further, the user consent controller 501*a* sends the OTP to the UE 300. Further, the user consent controller 501*a* receives the user consent update notification includes the user consent and the OTP from one of the application client 200 through the edge application server 700 and the edge enabler client 100. Further, the user consent controller 501*a* verifies the user consent based on the OTP. Further, the user consent controller 501*a* updates the at least one parameter of the user consent stored at the server 500. Further, the user consent controller 501*a* sends the user consent update response to the application client 200 through the edge application server 700.

In another embodiment, the user consent controller 501*a* receives the user consent grant notification from the application client 200. The user consent controller 501*a* stores the user consent in the memory 503*a* for a future usage purpose, when the edge enabler server 500*a* receives the user consent for first time.

In an embodiment, the user consent controller 501*a* receives the user consent update request from the application client 200 after storing the user consent. Further, the user consent controller 501*a* updates the at least one parameter of the user consent stored at the edge enabler server 500*a*. In an embodiment, the user consent controller 501*a* updates the former user consent stored at the edge enabler server 500*a* using the user consent received from the edge enabler client 100, when the edge enabler server 500*a* contains the former user consent. Further, the user consent controller 501*a* sends the user consent update response to the application client 200.

In an embodiment, the user consent controller 501*a* verifies the user consent with the edge enabler client 100 based on the nonce. In an embodiment, the user consent controller 501*a* stores the application specific user information and the user consent in the memory 503*a*. The user consent controller 501*a* verifies the user consent based on the application specific user information.

In an embodiment, the user consent controller 501*a* sends the request for the credentials to the CAPIF core function device 500*b* in response to receiving the request for the service from the edge application 600. The user consent controller 501*a* provides the service to the edge application 600 in response to receiving the credentials from the CAPIF core function device 500*b*. In an embodiment, the user consent controller 501*a* retrieves the user consent from the core network 400, in response to receiving the request for the service. In an embodiment, the user consent controller 501*a* sends the user consent request to the core network 400 where the user consent request indicates the request for the user consent. In an embodiment, the user consent controller 501*a* stores the user consent to the memory 503*a* in response to receiving the user consent response from the core network 400.

The service engine 502*a* receives the request for the service associated with the UE 300 from the edge application 600. When the user consent is available at the edge enabler server 500*a*, the service engine 502*a* provides the service associated with the UE 300 to the edge application 600. The service engine 502*a* provides the service associated with the UE 300 to the edge application 600, in response to receiving or storing the user consent at the edge enabler server 500*a*. The service engine 502*a* receives the request for the service including the application specific user information from the edge application 600. In an embodiment, the service engine 502*a* receives the request for the service from the edge application server 700. The service engine 502*a* sends the response for the service associated with the UE 300 to the edge application server 700 based on the user consent.

The memory 503*a*, the processor 504*a*, and the communicator 505*a* operates similar as the memory 103, the processor 104, and the communicator 105 respectively for reliable functioning of the edge enabler server 500*a*.

The block diagram of the CAPIF core function device 500*b*, is shown in the FIG. F. In an embodiment, the CAPIF core function device 500*b* includes a user consent controller 501*b*, an authorization engine 502*b*, a memory 503*b*, a processor 504*b*, and a communicator 505*b*, where the processor 504*b* is coupled to the memory 503*b*. The user consent controller 501*b* receives the request to perform authorization from the edge application 600. Further, the user consent controller 501*b* sends the request for the user consent to the edge enabler server 500*a* or the edge enabler client 100. The memory 503*b* stores the user consent in response to receiving the user consent from the edge enabler client 100. Further, the authorization engine 502*b* performs the authorization and the user consent controller 501*b* sends the authorization response to the edge application 600. In an embodiment, when the user consent is available at the CAPIF core function device 500*b* and the CAPIF core function device 500*b* receives the request for the authorization, the authorization engine 502*b* performs the authorization and the user consent controller 501*b* sends the authorization response to the edge application 600.

In response to receiving the user consent from the edge enabler server 500*a*, the authorization engine 502*b* performs the authorization and the user consent controller 501*b* sends the authorization response to the edge application 600. In an embodiment, the authorization engine 502*b* performs the authorization and generate the PSK, in response to receiving the request to perform the authorization from the edge application 600. Further, the user consent controller 501*b* sends the PSK to the edge application 600. In an embodiment, the user consent controller 501*b* sends the user consent request to the edge enabler client 100 for receiving the user consent. The authorization engine 502*b* sends the credentials to the edge enabler server 500*a* based on the user consent, in response to receiving the user consent. The memory 503*b*, the processor 504*b*, and the communicator 505*b* operates similar as the memory 103, the processor 104, and the communicator 105 respectively for reliable functioning of the CAPIF core function device 500*b*.

The block diagram of the edge application 600, is shown in the FIG. 2G. In an embodiment, the edge application 600 includes a user consent controller 601, a service engine 602, a memory 603, a processor 604, and a communicator 605, where the processor 604 is coupled to the memory 603. The user consent controller 601 requests to the edge enabler server 500*a* for obtaining the user consent. In an embodiment, the user consent controller 601 requests the CAPIF core function device 500*b* for performing the authorization. In an embodiment, the user consent controller 601 send the authorization request to the CAPIF core function device 500*b* for performing the authorization or obtaining the authorization credentials. The user consent controller 601 notifies the user consent grant to the Edge enabler server 500*a* in response to receiving the user consent grant includes the nonce/voucher/token form the application client 200. The service engine 602 requests to the edge enabler server 500*a* for the service. The memory 603, the processor 604, and the communicator 605 operates similar as the memory

103, the processor 104, and the communicator 105 respectively for reliable functioning of the edge application 600.

The block diagram of the edge application server 700, is shown in the FIG. 2H. In an embodiment, the edge application server 700 includes a user consent controller 701, a service engine 702, a memory 703, a processor 704, and a communicator 705, where the processor 704 is coupled to the memory 703. The user consent controller 701 shares the request for the user consent with the edge enabler server 500*a* in response to receiving the request for the user consent from the application client 200. The service engine 702 sends the request for the service associated with the UE 300 to the edge enabler server 500*a*. The memory 703, the processor 704, and the communicator 705 operates similar as the memory 103, the processor 104, and the communicator 105 respectively for reliable functioning of the edge application server 700.

Although each figure in the FIG. 2A-2H shows the hardware components of the devices in the system 1000 but it is to be understood that other embodiments are not limited thereon. In other embodiments, the devices in the system 1000 may include less or more number of components. Further, the labels or names of the components are used only for illustrative purpose and does not limit the scope of the invention. One or more components can be combined together to perform same or substantially similar function for providing the service to the edge application 600.

FIG. 3 is a sequential diagram illustrating signaling between the devices in the system for providing the service to the edge application 600 in response to receiving the request for the service, according to an embodiment as disclosed herein. At step S301, the edge application 600 sends the request for the service (e.g. a location service) or the UE ID to edge enabler server 500*a*. At step S302, the edge enabler server 500*a* checks whether the user consent is stored at the edge enabler server 500*a*.

At step S303, in response to detecting that the user consent for the service or the UE ID requested by the edge application 600 is not available with the edge enabler server 500*a*, the edge enabler server 500*a* sends the request for obtaining the user consent to the edge enabler client 100. The request for obtaining the user consent includes the service requested by the edge application 600 and information about the edge application 600, such as an application ID.

At step S304, the edge enabler client 100 requests to the user to provide the consent of the user for the service requested by the edge application 600. The edge enabler client 100 authorizes the user for accepting the grant/update of the user consent. In an embodiment, the user provides the consent to the edge application 600 to avail the service or the UE ID for once or always or a limited number of times or a time-bound or a location (such as geo-location) bound. At step S305, the edge enabler client 100 responds to the edge enabler server 500*a* with the user consent, in response to obtaining the consent from the user. At step S306, the edge enabler server 500*a* stores the received user consent for the future reference. At step S307, the edge enabler server 500*a* provides the service or the UE ID to the edge application 600 based on the received user consent. The edge enabler server 500*a* interacts with other devices in the system 1000 to provide the service or the UE ID to the edge application 600.

The various actions, acts, blocks, steps, or the like in the sequential diagram in FIG. 3 may be performed in the order presented, in a different order or simultaneously. Further, in some embodiments, some of the actions, acts, blocks, steps, or the like may be omitted, added, modified, skipped, or the like without departing from the scope of the invention.

FIG. 4 is a sequential diagram illustrating signaling between the devices in the system 1000 for providing the user consent to the edge application 600 in response to receiving the request for the user consent, according to an embodiment as disclosed herein. At step S401, the edge application 600 sends the request to the edge enabler server 500*a* for obtaining the user consent. The request for obtaining the user consent includes the details of the services needed for the edge application 600. In an embodiment, the request for obtaining the user consent is clubbed with a registration request of the edge application 600 to register on the edge enabler server 500*a*. At step S402, the edge enabler server 500*a* sends the request to the edge enabler client 100 to obtain the user consent. The request to obtain the user consent includes the information about the edge application 600 such as the application ID, and the service for which the user consent is requested by the edge application 600.

At step S403, the edge enabler client 100 requests the user to provide the consent for the service requested by the edge application 600. The edge enabler client 100 authorizes the user for accepting the grant/update of the user consent. In an embodiment, the user provides the consent to the edge application 600 to avail the service or the UE ID for once or always or a limited number of times or a time-bound or a location (such as geo-location) bound. At step S404, the edge enabler client 100 responds to the edge enabler server 500*a* with the user consent obtained from the user. At step S405, the edge enabler server 500*a* stores the received user consent for the future reference. At step S406, the edge enabler server 500*a* provides the response to the edge application 600 indicating that the edge enabler server 500*a* contains the user consent to avail the service or the UE ID.

The various actions, acts, blocks, steps, or the like in the sequential diagram in FIG. 4 may be performed in the order presented, in a different order or simultaneously. Further, in some embodiments, some of the actions, acts, blocks, steps, or the like may be omitted, added, modified, skipped, or the like without departing from the scope of the invention.

FIG. 5 is a sequential diagram illustrating signaling between the devices in the system 1000 for providing the UE ID to the edge application 600 in response to receiving the request for the UE ID, according to an embodiment as disclosed herein. The application client 200 does not provide a list of services to the edge application 600 until the application client 200 receives the user consent to provide the list of services to the edge application 600. In such a scenario, the edge enabler server 500*a* requests to the edge enabler client 100 to obtain the user consent upon receiving the request for UE ID or the service from the edge application 600 for which the edge application 600 does not have the user consent. At step S501, the edge application 600 send the request to the edge enabler server 500*a* with the application specific user information and the service that required for the edge enabler server 500*a*. In an embodiment, the request is for UE ID or for the service itself. At step S502, upon receiving the request, the edge enabler server 500*a* check for the stored user consents. If the user consent is not available, the edge enabler server 500*a* sends the user consent request to the edge enabler client 100. The request for the user consent includes the application ID and the service required for the edge application 600.

In an embodiment, the request for the user consent includes the application specific user information. At step S503, the edge enabler client 100 requests to the user for the user consent. The edge enabler client 100 authorizes the user for accepting the grant/update of the user consent. In an embodiment, the user provides the consent to the edge application 600 to avail the service or the UE ID for once or always or a limited number of times or a time-bound or a location (such as geo-location) bound. At step S504, the edge enabler client 100 shares the user consent with the edge enabler server 500*a*. At step S505, the edge enabler server 500*a* stores the user consent for the future reference. At step S506, the edge enabler server 500*a* responds to the edge application 600 accordingly either with the UE ID or the service which requested by the edge application 600.

The various actions, acts, blocks, steps, or the like in the sequential diagram in FIG. 5 may be performed in the order presented, in a different order or simultaneously. Further, in some embodiments, some of the actions, acts, blocks, steps, or the like may be omitted, added, modified, skipped, or the like without departing from the scope of the invention.

FIG. 6 is a sequential diagram illustrating signaling between the devices in the system 1000 for providing the user consent to the edge application 600 in response to receiving the user consent voluntarily provided by the user, according to an embodiment as disclosed herein. At step S601, the user voluntarily grands or updates the user consent on the UE 300 using the edge enabler client 100 for providing the service to the edge application 600. The edge enabler client 100 authorizes the user for accepting the grant/update of the user consent. In an embodiment, the user provides the consent to the edge application 600 to avail the service or the UE ID for once or always or a limited number of times or a time-bound or a location (such as geolocation) bound.

At step S602, the edge enabler client 100 requests the edge enabler server 500*a* to grant/update the user consent. At step S603, the edge enabler server 500*a* sends a user consent grant/update response to the edge enabler client 100, in response to receiving the request for granting or updating the user consent. At step S604, the edge enabler server 500*a* stores the user consent for the future reference, when the edge enabler server 500*a* receives the user consent for first time. The edge enabler server 500*a* updates the former user consent stored at the edge enabler server 500*a* using the user consent received from the edge enabler client 100, when the edge enabler server 500*a* contains the former user consent. At step S605, the edge enabler server 500*a* shares the user consent with the edge application 600 by sending the user consent grant/update notification.

The various actions, acts, blocks, steps, or the like in the sequential diagram in FIG. 6 may be performed in the order presented, in a different order or simultaneously. Further, in some embodiments, some of the actions, acts, blocks, steps, or the like may be omitted, added, modified, skipped, or the like without departing from the scope of the invention.

FIG. 7 is a sequential diagram illustrating signaling between the devices in the system 1000 for storing the user consent at the edge enabler server 500*a* in response to receiving the user consent voluntarily provided by the user and verifying the user consent, according to an embodiment as disclosed herein. At step S701, the user voluntarily grands the user consent on the UE 300 using the application client 200 for providing the service to the edge application 600. At step S702, the application client 200 requests to the edge enabler client 100 for the voucher/token/nonce. In another embodiment, the edge enabler client 100 requests to a server such as an OAuth authorization server or the CAPIF core function device 500*b* for the voucher/token/nonce. At step S703, the edge enabler client 100 generates the voucher/token/nonce and send a response including the voucher/token/nonce with the application client 200. At step S704, the application client 200 includes the voucher/token/nonce with the user consent and shares the user consent with the edge application 600 corresponds to the application client 200.

At step S705, the edge application 600 acknowledges the response with the application client 200 upon receiving the user consent. At step S706, the edge application 600 provides the user consent to the edge enabler server 500*a* as the user consent grant notification. Further, the edge enabler server 500*a* tries to verify the user consent using the voucher/token/nonce. At step S707, the edge enabler server 500*a* request to the edge enabler client 100 to verify the user consent, when the edge enabler server 500*a* is unable to verify the user consent. The edge enabler client 100 verifies the user consent by matching the voucher/token/nonce in the user consent with the voucher/token/nonce generated by the edge enabler client 100. At step S708, the edge enabler client 100 responds to the edge enabler server 500*a* with the verification response, in response to verifying the user consent. At step S709, the edge enabler server 500*a* stores the user consent, in response to verifying the user consent or receiving the verification response.

The various actions, acts, blocks, steps, or the like in the sequential diagram in FIG. 7 may be performed in the order presented, in a different order or simultaneously. Further, in some embodiments, some of the actions, acts, blocks, steps, or the like may be omitted, added, modified, skipped, or the like without departing from the scope of the invention.

Figure 8:
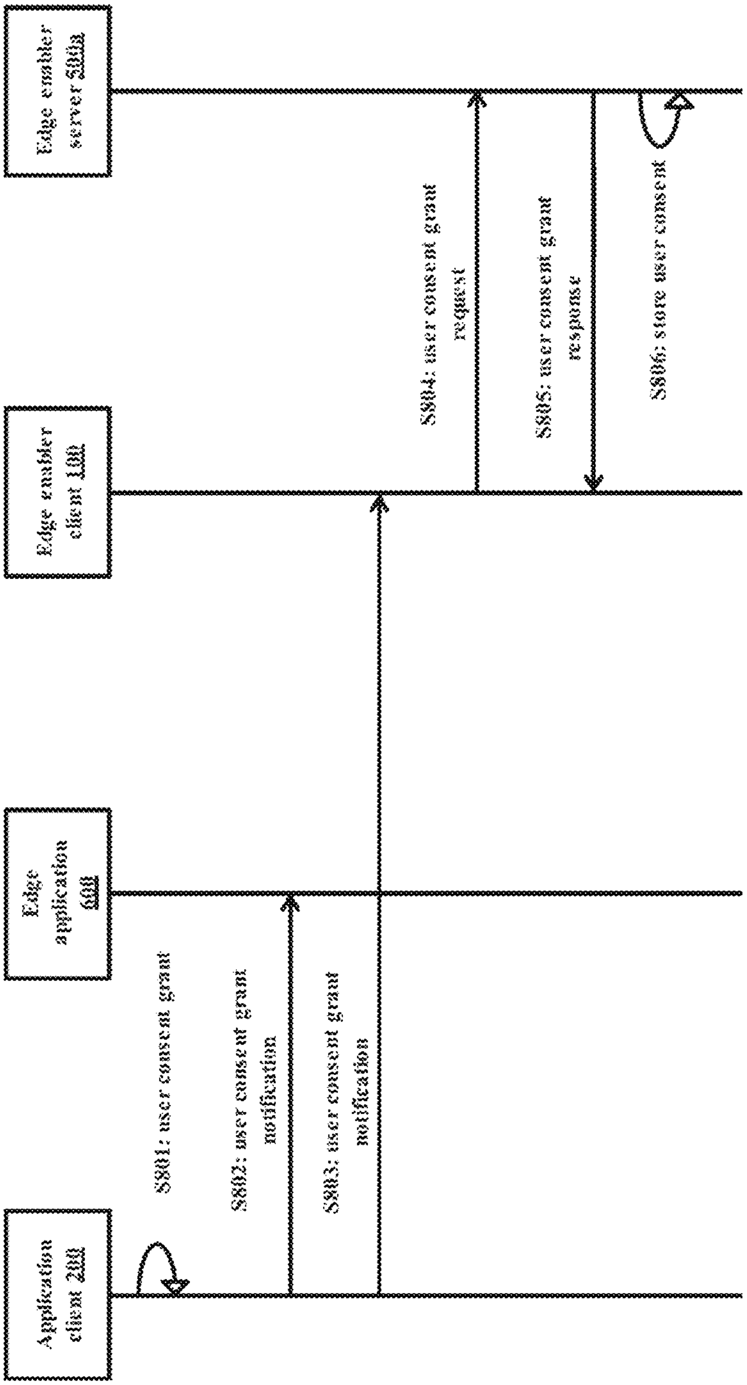
FIG. 8 is a sequential diagram illustrating signaling between the devices in the system for storing the user consent at the edge enabler server in response to receiving the user consent voluntarily provided by the user, according to an embodiment as disclosed herein.

FIG. 8 is a sequential diagram illustrating signaling between the devices in the system 1000 for storing the user consent at the edge enabler server 500*a* in response to receiving the user consent voluntarily provided by the user, according to an embodiment as disclosed herein. At step S801, the user voluntarily grands the user consent on the UE 300 using the application client 200 for providing the service to the edge application 600. At step S802, the application client 200 notifies the edge application 600 with the user consent grant notification includes the user consent. At step S803, the application client 200 notifies the edge application 600 with the user consent grant notification. The edge enabler client 100 being part of a system kernel has a capability to determine whether the user consent received from the application client 200 is legitimate. At step S804, in response to determining that the notification is legitimate, the edge enabler client 100 sends the user consent grant request to the edge enabler server 500*a*. At step S805, the edge enabler server 500*a* acknowledges to the edge enabler client 100 by sending the user consent grant response, in response to receiving the user consent. At step S806, the edge enabler server 500*a* stores the user consent.

The various actions, acts, blocks, steps, or the like in the sequential diagram in FIG. 8 may be performed in the order presented, in a different order or simultaneously. Further, in some embodiments, some of the actions, acts, blocks, steps, or the like may be omitted, added, modified, skipped, or the like without departing from the scope of the invention.

Figure 9:
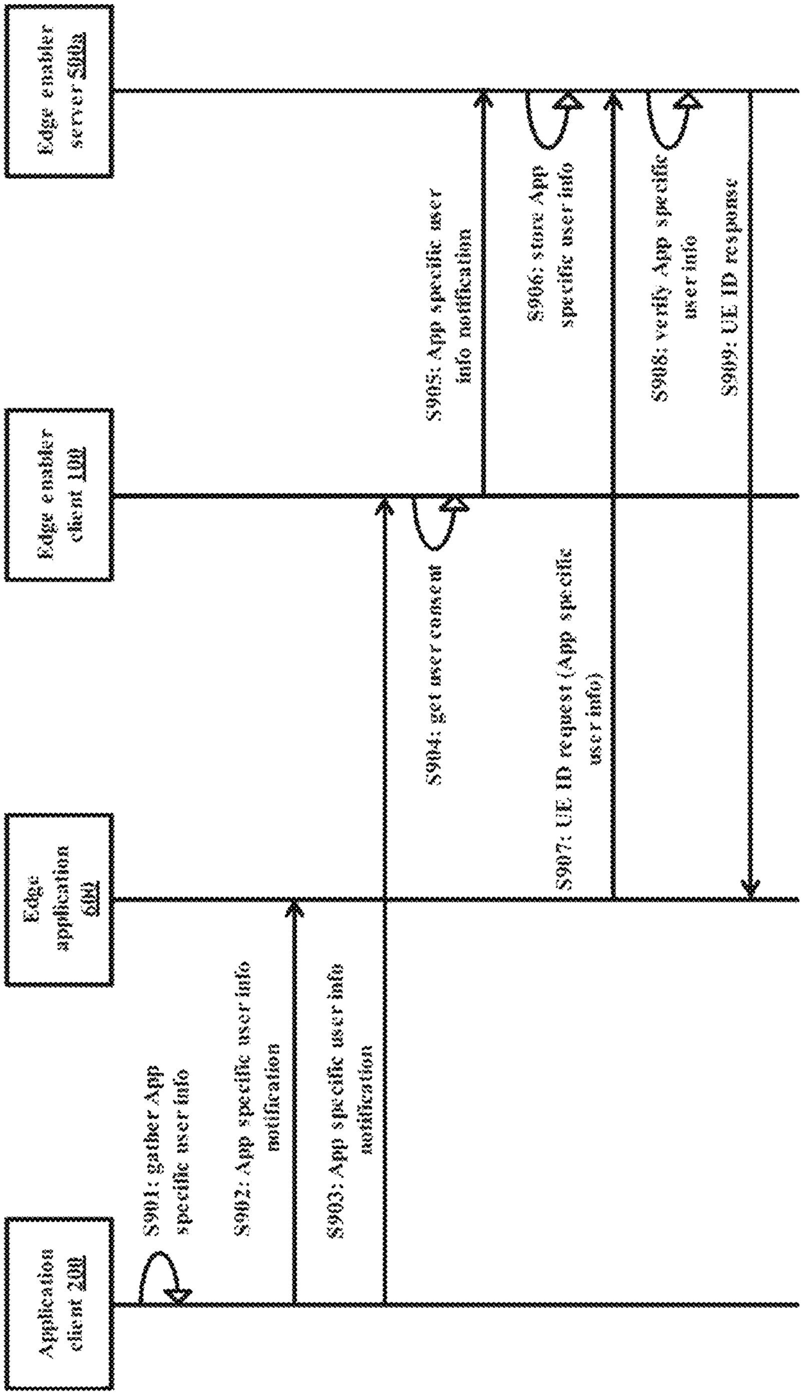
FIG. 9 is a sequential diagram illustrating signaling between the devices in the system for providing the UE ID to the edge application in response to receiving the user consent voluntarily provided by the user and verifying an application specific user information, according to an embodiment as disclosed herein.

FIG. 9 is a sequential diagram illustrating signaling between the devices in the system 1000 for providing the UE ID to the edge application 600 in response to receiving the user consent voluntarily provided by the user and verifying the application specific user information, according to an embodiment as disclosed herein. At step S901, the application client 200 gathers all the application specific user information which are used to uniquely identify the user within a domain of the edge application 600. In an embodiment, edge application 600 determines the edge related services which requires the user consent while determining the application specific user information. At step S902, the application client 200 notifies the application specific user information to the edge application 600. At step S903, the application client 200 notifies the application specific user information to the edge enabler client 100. In an embodiment, the application client 200 notifies the application specific user information to an operating system of the edge enabler client 100 in a form of the manifest.

At step S904, the edge enabler client 100 notifies the user the details of the services for which the user consent is needed and request for the user consent. The edge enabler client 100 authorizes the user for accepting the grant of the user consent. In an embodiment, the user provides the consent to the edge application 600 to avail the service or the UE ID for once or always or a limited number of times or a time-bound or a location (such as geo-location) bound. At step S905, in response to obtaining the user consent from the user, the edge enabler client 100 shares the application specific user information with the edge enabler server 500*a* along with the user consent. At step S906, the edge enabler server 500*a* stores the application specific user information and the user consent along with a reference to the edge enabler client 100 for a future use. The edge enabler client 100 uses this reference to map the application specific user information to the UE 300 uniquely.

At step S907, the edge application 600 requests the edge enabler server 500*a* for the UE ID by sending the UE ID request along with the application specific user information to the edge enabler server 500*a*. The UE ID request indicates the edge enabler server 500*a* the service required for the edge application 600. At step S908, the edge enabler server 500*a* verifies the user consent for the services requested by the edge application 600 using the application specific user information stored at the edge enabler server 500*a*. In an embodiment, the edge enabler server 500*a* verifies the application-specific user information stored at the edge enabler server 500*a* to by mapping the application-specific user information in the UE ID request. At step S909, the edge enabler server 500*a* shares the UE ID with the edge application 600 anonymously.

According to existing 3GPP standards, the edge application 600 shares the application specific user information with the edge enabler server 500*a* to obtain the UE ID. Further, the edge enabler server 500*a* provides the UE ID directly to the edge application 600 by invoking corresponding service APIs on the edge enabler server 500*a* or the 3GPP core network 400 based on the application specific user information. Unlike the existing 3GPP standards, the proposed method allows an application client 200 to share the application specific user information with the edge enabler server 500*a* for correlating the application specific user information with the UE 300. In an embodiment, the edge application 600 generates the manifest detailing all the services for which the user consent is needed.

The various actions, acts, blocks, steps, or the like in the sequential diagram in FIG. 9 may be performed in the order presented, in a different order or simultaneously. Further, in some embodiments, some of the actions, acts, blocks, steps, or the like may be omitted, added, modified, skipped, or the like without departing from the scope of the invention.

Figure 10:
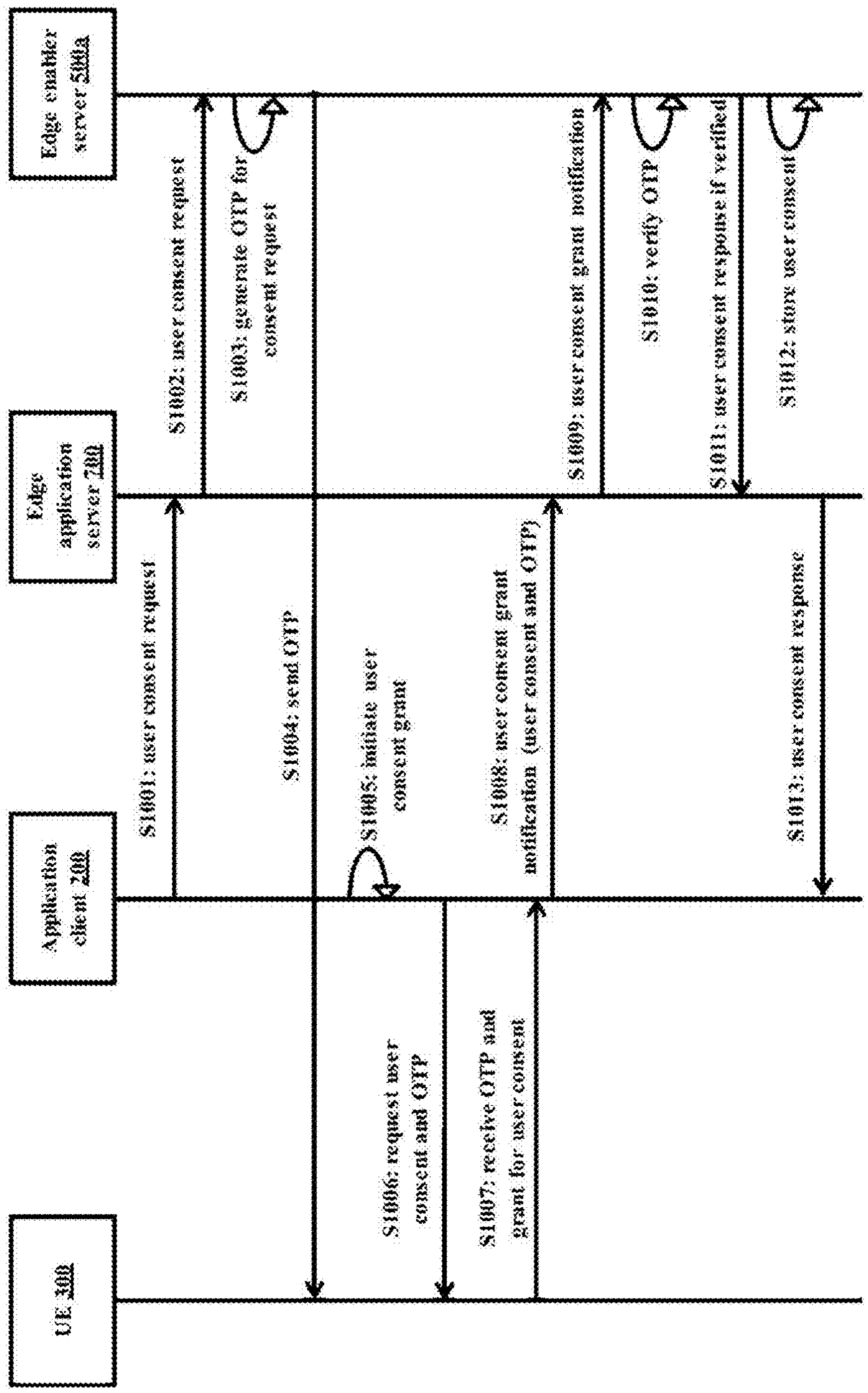
FIG. 10 is a sequential diagram illustrating signaling between the devices in the system for providing the service to the edge application in response to initiating a user consent grant by an application client and verifying a OTP, according to an embodiment as disclosed herein.

FIG. 10 is a sequential diagram illustrating signaling between the devices in the system 1000 for providing the service to the edge application 600 in response to initiating the user consent grant by the application client 200 and verifying the OTP, according to an embodiment as disclosed herein. At step S1001, the application client 200 sends the request for the user consent to the edge application server 700, when the application client 200 needs the user consent. At step S1002, upon receiving the request for the user consent from the application client 200, the edge application server 700 shares the request for the user consent to the edge enabler server 500*a*. At step S1003, the edge enabler server 500*a* generates the OTP for obtaining the user consent. At step S1004, the edge enabler server 500*a* shares the OTP with the UE 300. A channel of sharing the OTP by the edge enabler server 500*a* to the UE 300 is determined based on the user contact information such as a mobile number, email address, etc. available at the edge enabler server 500*a*. At step S1005, upon requesting the user consent with the edge application server 700, the application client 200 initiates steps to obtain the user consent grant from the user.

At step S1006, the application client 200 requests the user using the UE 300 to input the OTP in the consent for providing the consent to the application client 200. At step S1007, in response to receiving the input for the OTP and the grant of user consent from the user, the UE 300 shares the OTP and the user consent given by the user with the application client 200. At step S1008, the application client 200 notifies the user consent and the OTP to the edge application server 700 using the user consent grant notification. At step S1009, the edge application server 700 notifies the user consent and the OTP to the edge enabler server 500*a*, in response to receiving the user consent grant notification from the edge application server 700. At step S1010, upon receiving the user consent and the OTP, the edge enabler server 500*a* verifies the received OTP with the OTP generated by the edge enabler server 500*a*. At step S1011, upon matching both the OTPs, the edge enabler server 500*a* responds with the user consent to the edge application server 700. At step S1012, the edge enabler server 500*a* stores the user consent. At step S1013, the edge application server 700 responds the user consent with the application client 200, in response to receiving the user consent.

The various actions, acts, blocks, steps, or the like in the sequential diagram in FIG. 10 may be performed in the order presented, in a different order or simultaneously. Further, in some embodiments, some of the actions, acts, blocks, steps, or the like may be omitted, added, modified, skipped, or the like without departing from the scope of the invention.

Figure 11:
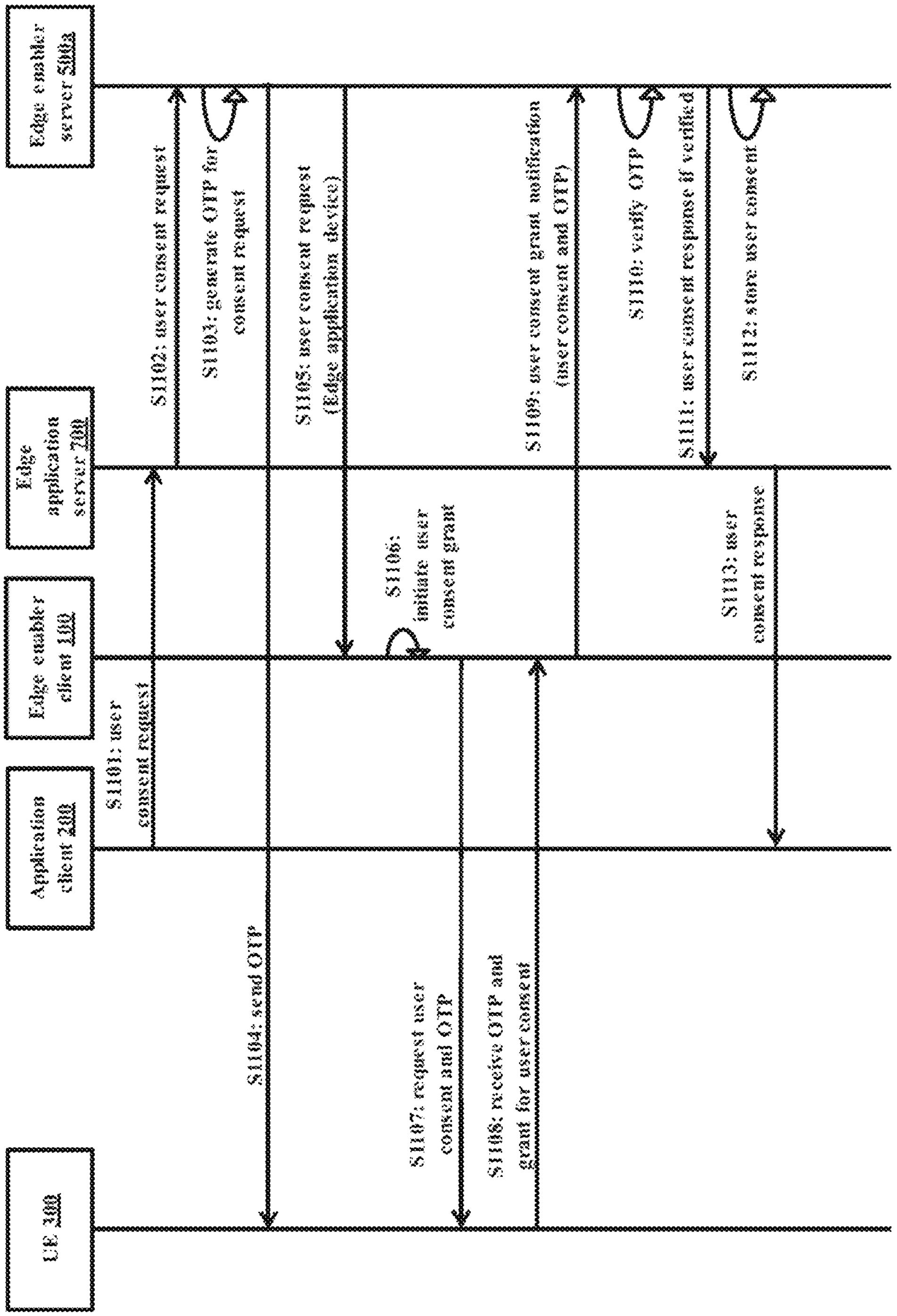
FIG. 11 is a sequential diagram illustrating signaling between the devices in the system for providing the service to the edge application in response to initiating the user consent grant by an edge enabler client and verifying the OTP, according to an embodiment as disclosed herein.

FIG. 11 is a sequential diagram illustrating signaling between the devices in the system 1000 for providing the service to the edge application 600 in response to initiating the user consent grant by the edge enabler client 100 and verifying the OTP, according to an embodiment as disclosed herein. At step S1101, the application client 200 sends the request for the user consent to the edge application server 700, when the application client 200 needs the user consent. At step S1102, upon receiving the request for the user consent from the application client 200, the edge application server 700 shares the request for the user consent to the edge enabler server 500*a*. At step S1103, the edge enabler server 500*a* generates the OTP for obtaining the user consent. At step S1104, the edge enabler server 500*a* shares the OTP with the UE 300. A channel of sharing the OTP by the edge enabler server 500*a* to the UE 300 are based on the user contact information such as a mobile number, email address, etc. available at the edge enabler server 500*a*. At step S1105, upon sending the OTP to the UE 300, edge enabler server 500*a* requests for granting the user consent to the edge enabler client 100. At step S1106, upon receiving the request for granting the user consent, the edge enabler client 100 initiates steps to obtain the user consent grant from the user.

At step S1107, the edge enabler client 100 requests the user using the UE 300 to input the OTP in the consent for providing the consent to the application client 200. At step S1108, in response to receiving the input for the OTP and the grant of user consent from the user, the UE 300 shares the OTP and the user consent given by the user with the edge enabler client 100. At step S1109, the edge enabler client 100 notifies the user consent and the OTP to the edge enabler server 500*a* using the user consent grant notification. At step S1110, upon receiving the user consent and the OTP, the edge enabler server 500*a* verifies the received OTP with the OTP generated by the edge enabler server 500*a*. At step S1111, upon matching both the OTPs, the edge enabler server 500*a* responds with the user consent to the edge application server 700. At step S1112, the edge enabler server 500*a* stores the user consent. At step S1113, the edge application server 700 responds the user consent with the application client 200, in response to receiving the user consent.

The various actions, acts, blocks, steps, or the like in the sequential diagram in FIG. 11 may be performed in the order presented, in a different order or simultaneously. Further, in some embodiments, some of the actions, acts, blocks, steps, or the like may be omitted, added, modified, skipped, or the like without departing from the scope of the invention.

Figure 12:
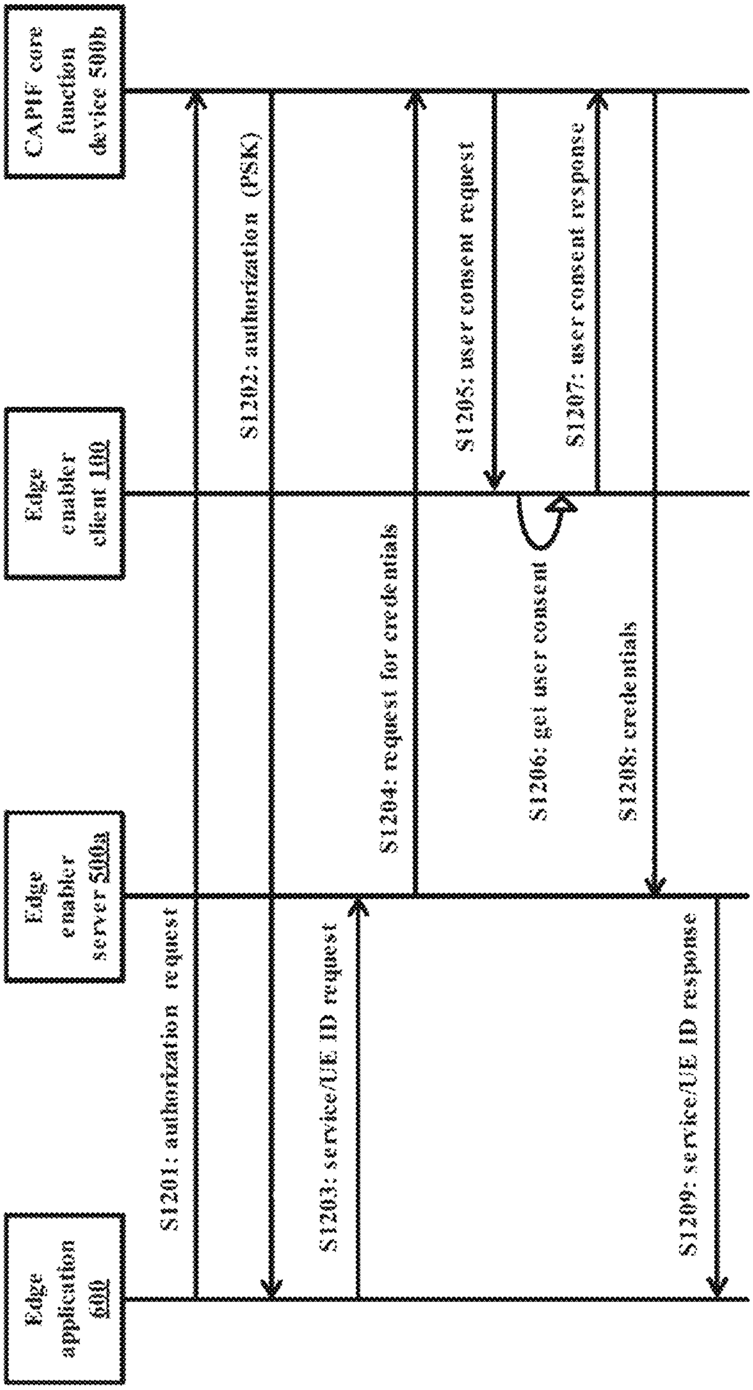
FIG. 12 is a sequential diagram illustrating signaling between the devices in the system for providing the service to the edge application based on an authorization from a CAPIF core function device, according to an embodiment as disclosed herein.

FIG. 12 is a sequential diagram illustrating signaling between the devices in the system 1000 for providing the service to the edge application 600 based on the authorization from the CAPIF core function device 500*b*, according to an embodiment as disclosed herein. At step S1201, the edge application 600 requests to the CAPIF core function device 500*b* for authorization. At step S1202, the CAPIF core function device 500*b* grants the authorization and shares the PSK to the edge application 600. At step S1203, the edge application 600 requests for the service or the UE ID to the edge enabler server 500*a* in response to receiving the PSK. At step S1204, the edge enabler server 500*a* requests for the credentials for authorizing the edge application 600 to the CAPIF core function device 500*b*. In an embodiment, the edge enabler server 500*a* sends the information about the edge enabler client 100 and the edge application 600 to the CAPIF core function device 500*b* along with the request for the credentials.

In an embodiment, the edge enabler server 500*a* sends the details about the authorization request to the CAPIF core function device 500*b* along with the request. At step S1205, upon receiving the request from the edge enabler server 500*a*, the CAPIF core function device 500*b* requests the edge enabler client 100 to obtain the user consent. In an embodiment, the CAPIF core function device 500*b* shares the details received in the information about the edge enabler client 100, the edge application 600 and details about the authorization request with the edge enabler client 100. At step S1206, the edge enabler client 100 requests to the user for the user consent. The edge enabler client 100 authorizes the user for accepting the grant of the user consent. In an embodiment, the user provides the consent to the edge application 600 to avail the service or the UE ID for once or always or a limited number of times or a time-bound or a location (such as geo-location) bound.

At step S1207, the edge enabler client 100 shares the user consent with the CAPIF core function device 500*b*, in response to obtaining the user consent from the user. At step S1208, the CAPIF core function device 500*b* shares the credentials with the edge enabler server 500*a* based on the user consent received from the edge enabler client 100. At step S1209, upon receiving the credentials from the CAPIF core function device 500*b*, the edge enabler server 500*a* authorizes the edge application 600 and provides the requested service or the UE ID to the edge application 600.

The various actions, acts, blocks, steps, or the like in the sequential diagram in FIG. 12 may be performed in the order presented, in a different order or simultaneously. Further, in some embodiments, some of the actions, acts, blocks, steps, or the like may be omitted, added, modified, skipped, or the like without departing from the scope of the invention.

FIG. 13 is a sequential diagram illustrating signaling between the devices in the system 1000 for providing the authorizing credentials to the edge application 600 based on the user consent, according to an embodiment as disclosed herein. At step S1301, the edge application 600 sends the request to the CAPIF core function device 500*b* for the authorization credentials. The edge application 600 provides the details of the relevant edge enabler client 100 to the CAPIF core function device 500*b* along with the request for the authorization credentials. In an embodiment, the details of the relevant edge enabler client 100 is provides based on the information received from the application client 200.

At step S1302, the CAPIF core function device 500*b* sends the request to the edge enabler client 100 to obtain the user consent for performing the authorization and providing the authorization credentials. At step S1303, the edge enabler client 100 requests the user to provide the consent for providing the authorization credentials to the edge application 600. The edge enabler client 100 authorizes the user for accepting the grant of the user consent. At step S1304, the edge enabler client 100 responds to the CAPIF core function device 500*b* with the user consent obtained from the user. At step S1305, the CAPIF core function device 500*b* and stores the received user consent for the future reference. Further, the CAPIF core function device 500*b* performs the authorization and generates the authorization credentials. At step S1306, the CAPIF core function device 500*b* provides the authorization response includes the authorization credentials to the edge application 600.

In an embodiment, the CAPIF core function device 500*b* implements the OAuth authorization server of a mobile network operator. In an embodiment, the CAPIF core function device 500*b* implements an OpenID connect protocol to provide the authorization to the edge application 600 in form of an anonymous identity token.

In an alternate embodiment, the CAPIF core function device 500*b* is replaced with a standalone OAuth authorization server also implementing the OpenID connect protocol for providing the authorization to the edge application 600 in form of the anonymous identity token or OAuth tokens.

The various actions, acts, blocks, steps, or the like in the sequential diagram in FIG. 13 may be performed in the order presented, in a different order or simultaneously. Further, in some embodiments, some of the actions, acts, blocks, steps, or the like may be omitted, added, modified, skipped, or the like without departing from the scope of the invention.

FIG. 14 is a sequential diagram illustrating signaling between the devices in the system 1000 for providing the authorization credentials to the edge application 600 based on the user consent obtained through the edge enabler server 500*a*, according to an embodiment as disclosed herein. At step S1401, the edge application 600 sends the request to the CAPIF core function device 500*b* for the authorization credentials. At step S1402, upon receiving the request for the authorization credentials from the edge application 600, the CAPIF core function device 500*b* requests to the edge enabler server 500*a* for the user consent.

At step S1403, the edge enabler server 500*a* requests the relevant edge enabler client 100 to obtain the user consent from the user. At step S1404, the edge enabler client 100 obtains the user consent after due authentication of the user. At step S1405, the edge enabler client 100 shares the user consent to the edge enabler server 500*a*. At step S1406, the edge enabler server 500*a* shares the user consent to the CAPIF core function device 500*b*. At step S1407, the edge enabler server 500*a* stores the user consent for the future reference. Further, the CAPIF core function device 500*b* performs authorization based on the user consent and generates the authorization credentials. At step S1408, the CAPIF core function device 500*b* shares the authorization response includes the authorization credentials to the edge application 600.

The various actions, acts, blocks, steps, or the like in the sequential diagram in FIG. 14 may be performed in the order presented, in a different order or simultaneously. Further, in some embodiments, some of the actions, acts, blocks, steps, or the like may be omitted, added, modified, skipped, or the like without departing from the scope of the invention.

Figure 15:
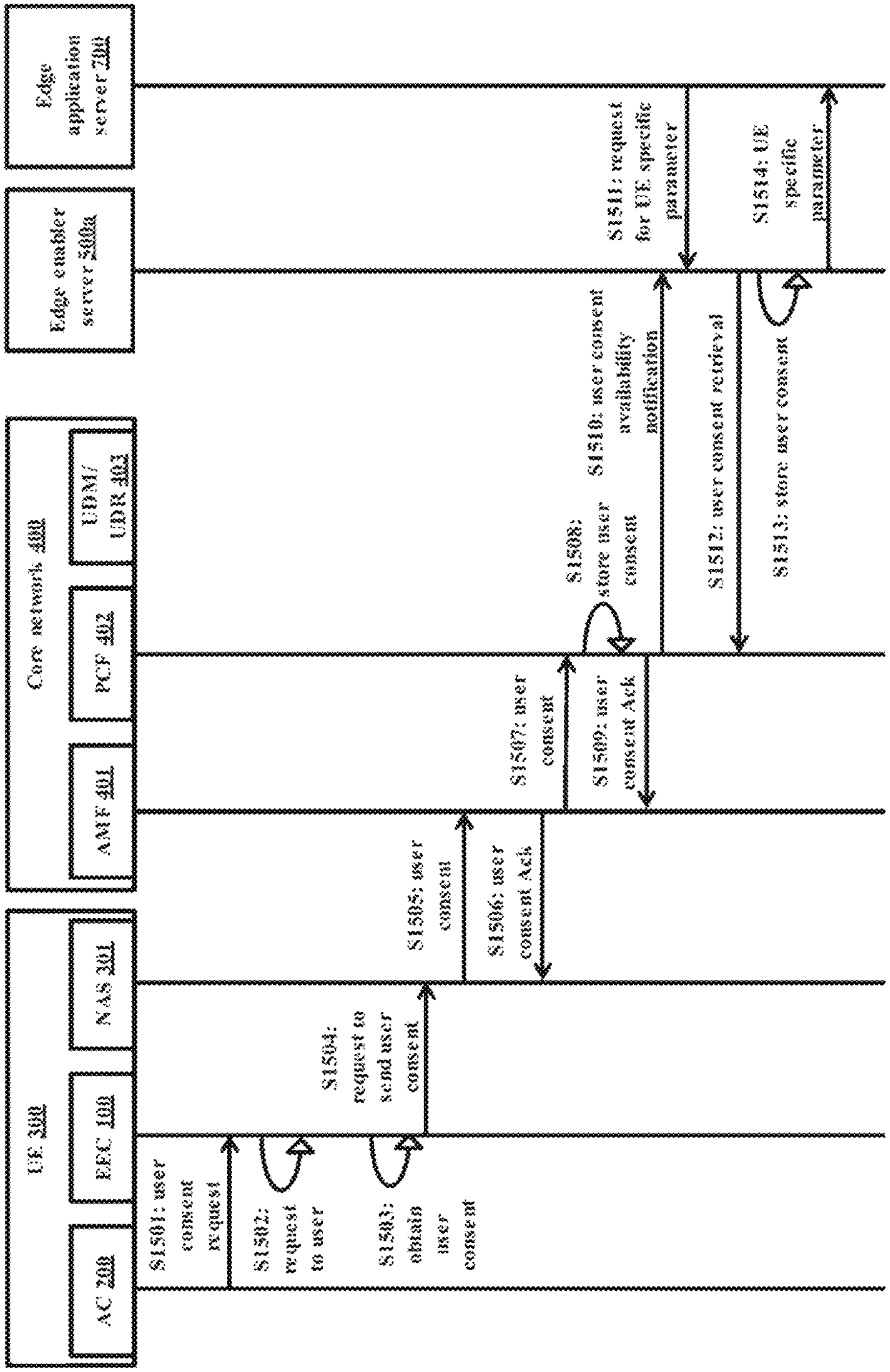
FIG. 15 is a sequential diagram illustrating signaling between the devices in the system for providing the service to an edge application server in response to obtaining the user consent from the edge enabler client through a Policy Control Function (PCF), according to an embodiment as disclosed herein.

FIG. 15 is a sequential diagram illustrating signaling between the devices in the system 1000 for providing the service to the edge application server 700 in response to obtaining the user consent from the edge enabler client 100 through the PCF 402, according to an embodiment as disclosed herein. At step S1501, the application client 200 triggers the edge enabler client 100 to initiate the steps to obtain the user consent based on the request received from the edge application server 700 or the edge application 600. In an embodiment, the edge application server 700 triggers the application client 200 to initiate steps for obtaining the user consent. At step S1502, the edge enabler client 100 requests the user to provide the user consent. The user grants/updates the user consent on the UE 300 for providing the service to the edge application 600.

At step S1503, the edge enabler client 100 authorizes the user for accepting the grant of the user consent. At step S1504, the edge enabler client 100 request the NAS 301 to send the user consent to the core network 400 in response to obtaining the user consent, where the request includes the user consent. At step S1505, the NAS 301 sends the user consent as a NAS user data payload or alternatively as part of a control plane payload to the AMF 401 by securing the user consent using a NAS security key. At step S1506, the AMF 401 acknowledges the reception of the user consent to the NAS 301. At step S1507, the AMF 401 sends the user consent to the PCF 402. At step S1508, the PCF 402 stores the user consent as part of a subscription profile. At step S1509, the PCF 402 acknowledges the reception of the user consent to the AMF 401. At step S1510, the PCF 402 notifies the edge enabler server 500*a* that the user consent is available at the PCF 402.

At step S1511, the edge enabler server 500*a* receives the request for a sensitive information such as the UE specific parameter (e.g. UE ID) from the edge application server 700 or any request from the edge application server 700. Further, the edge enabler server 500*a* checks for the user consent is available for providing the UE specific parameter to the edge application server 700. Upon detecting that the user consent is available at the edge enabler server 500*a* and not verified, the edge enabler server 500*a* verifies the user consent by checking whether the user provides the permission to expose the UE specific parameter out of the core network 400. At step S1512, upon detecting that the user consent is not available at the edge enabler server 500*a* and notification about the availability of the user consent at the PCF 402 is received, the edge enabler server 500*a* fetches the user consent from the PCF 402. In an embodiment, the edge enabler server 500*a* identifies the user consent stored at the PCF 402 for fetching the user consent based on a subscription ID of the UE 300 or an application ID (e.g. application layer client ID). At step S1513, the edge enabler server 500*a* stores the user consent and deletes the notification. Further, the edge enabler server 500*a* verifies the user consent. At step S1514, edge enabler server 500*a* responses with the UE specific parameter to the edge application server 700, in response to verifying the user consent.

The various actions, acts, blocks, steps, or the like in the sequential diagram in FIG. 15 may be performed in the order presented, in a different order or simultaneously. Further, in some embodiments, some of the actions, acts, blocks, steps, or the like may be omitted, added, modified, skipped, or the like without departing from the scope of the invention.

Figure 16:
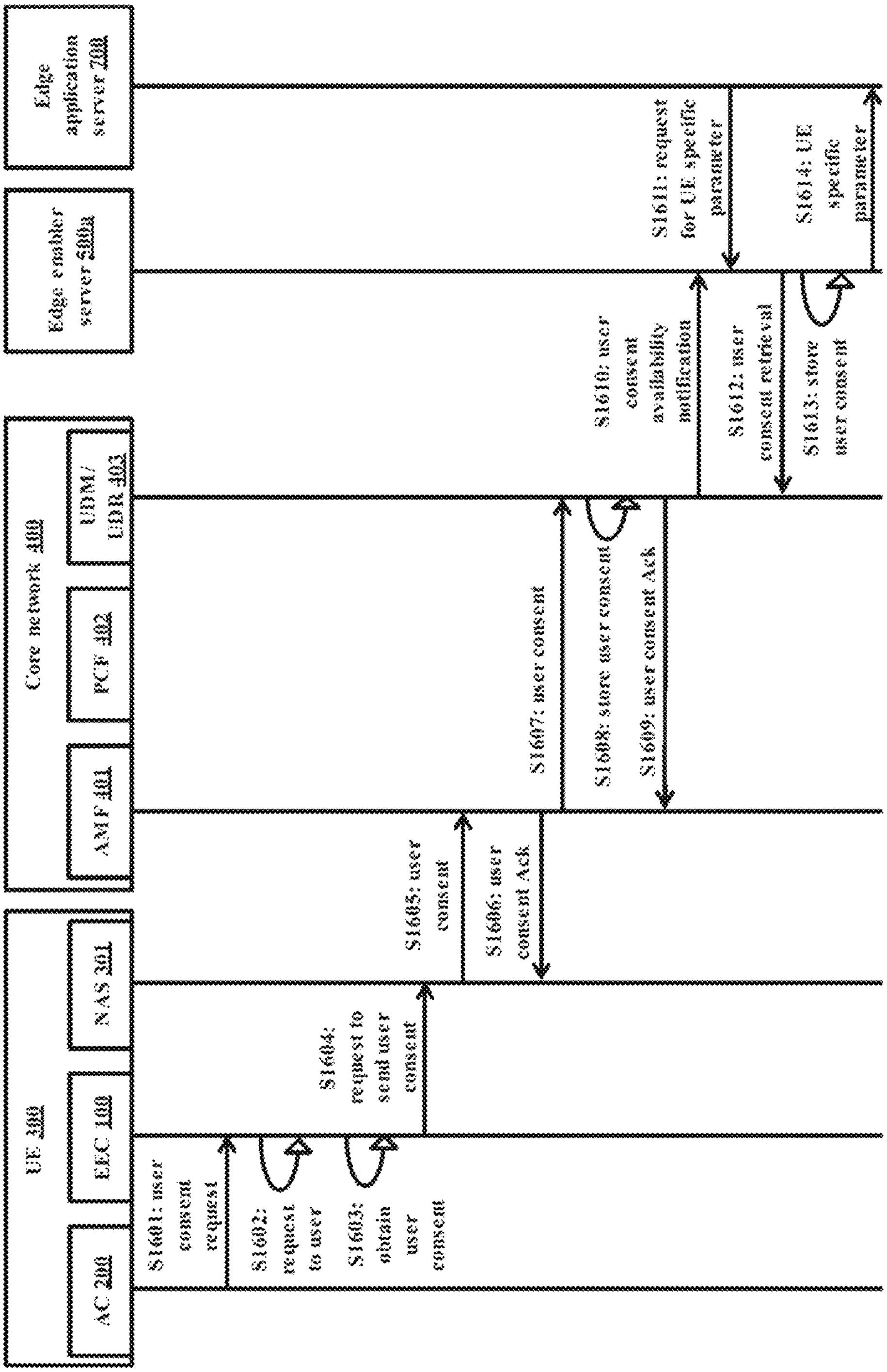
FIG. 16 is a sequential diagram illustrating signaling between the devices in the system for providing the service to the edge application server in response to obtaining the user consent from the edge enabler client through a Unified Data Management/Unified Data Repository (UDM/UDR), according to an embodiment as disclosed herein.

FIG. 16 is a sequential diagram illustrating signaling between the devices in the system 1000 for providing the service to the edge application server 700 in response to obtaining the user consent from the edge enabler client 100 through the UDM/UDR 403, according to an embodiment as disclosed herein. At step S1601, the application client 200 triggers the edge enabler client 100 to initiate the steps to obtain the user consent based on the request received from the edge application server 700 or the edge application 600. In an embodiment, the edge application server 700 triggers the application client 200 to initiate steps for obtaining the user consent. At step S1602, the edge enabler client 100 requests the user to provide the user consent. The user grants/updates the user consent on the UE 300 for providing the service to the edge application 600.

At step S1603, the edge enabler client 100 authorizes the user for accepting the grant of the user consent. At step S1604, the edge enabler client 100 request the NAS 301 to send the user consent to the core network 400 in response to obtaining the user consent, where the request includes the user consent. At step S1605, the NAS 301 sends the user consent as the NAS user data payload or alternatively as part of the control plane payload to the AMF 401 by securing the user consent using the NAS security key. At step S1606, the AMF 401 acknowledges the reception of the user consent to the NAS 301. At step S1607, the AMF 401 sends the user consent to the UDM/UDR 403. At step S1608, the UDM/UDR 403 stores the user consent as part of the subscription profile. At step S1609, the UDM/UDR 403 acknowledges the reception of the user consent to the AMF 401. At step S1610, the UDM/UDR 403 notifies the edge enabler server 500*a* that the user consent is available at the UDM/UDR 403.

At step S1611, the edge enabler server 500*a* receives the request for the UE specific parameter from the edge application server 700 or any request from the edge application server 700. Further, the edge enabler server 500*a* checks for the user consent is available for providing the UE specific parameter to the edge application server 700. Upon detecting that the user consent is available at the edge enabler server 500*a* and not verified, the edge enabler server 500*a* verifies the user consent by checking whether the user provides the permission to expose the UE specific parameter out of the core network 400. At step S1612, upon detecting that the user consent is not available at the edge enabler server 500*a* and notification about the availability of the user consent at the UDM/UDR 403 is received, the edge enabler server 500*a* fetches the user consent from the UDM/UDR 403. In an embodiment, the edge enabler server 500*a* identifies the user consent stored at the UDM/UDR 403 for fetching the user consent based on the subscription ID of the UE 300 or the application ID. At step S1613, the edge enabler server 500*a* stores the user consent and deletes the notification. Further, the edge enabler server 500*a* verifies the user consent. At step S1614, edge enabler server 500*a* responses with the UE specific parameter to the edge application server 700, in response to verifying the user consent.

The various actions, acts, blocks, steps, or the like in the sequential diagram in FIG. 16 may be performed in the order presented, in a different order or simultaneously. Further, in some embodiments, some of the actions, acts, blocks, steps, or the like may be omitted, added, modified, skipped, or the like without departing from the scope of the invention.

Figure 17:
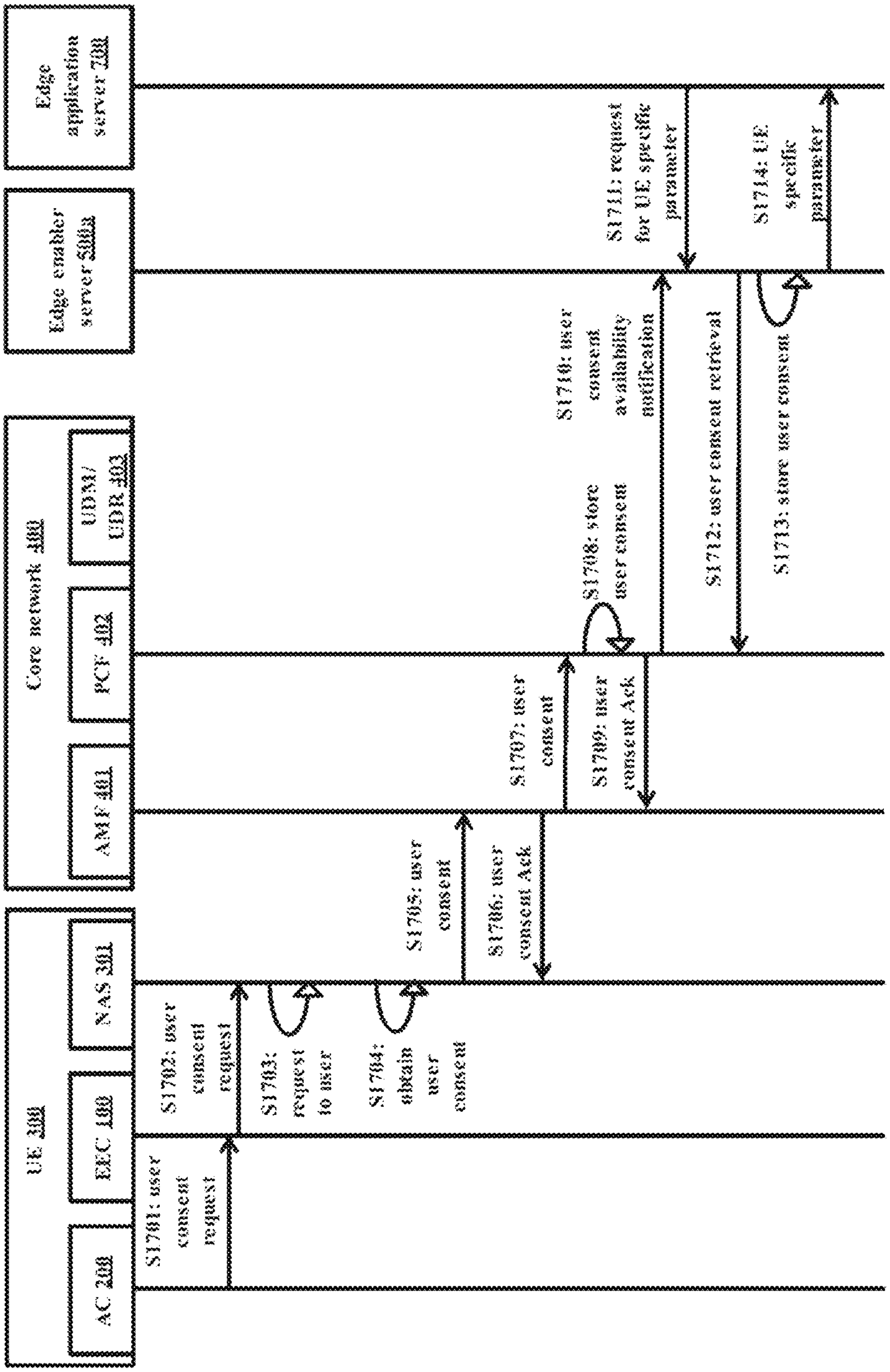
FIG. 17 is a sequential diagram illustrating signaling between the devices in the system for providing the service to the edge application server in response to obtaining the user consent from a non-access stratum layer through the PCF, according to an embodiment as disclosed herein.

FIG. 17 is a sequential diagram illustrating signaling between the devices in the system 1000 for providing the response for the service to the edge application server 700 in response to obtaining the user consent from the NAS 301 through the PCF 402, according to an embodiment as disclosed herein. At step S1701, the application client 200 triggers the edge enabler client 100 to initiate the steps to obtain the user consent based on the request received from the edge application server 700 or the edge application 600. In an embodiment, the edge application server 700 triggers the application client 200 to initiate steps for obtaining the user consent. At step S1702, the edge enabler client 100 requests the NAS 301 to obtain the user consent. At step S1703, the NAS 301 request the user for the user consent. The user grants/updates the user consent on the UE 300 for providing the service to the edge application 600. At step S1704, the NAS 301 authorizes the user for accepting the grant of the user consent. At step S1705, the NAS 301 sends the user consent as the NAS user data payload or alternatively as part of the control plane payload to the AMF 401 by securing the user consent using the NAS security key. At step S1706, the AMF 401 acknowledges the reception of the user consent to the NAS 301. At step S1707, the AMF 401 sends the user consent to the PCF 402. At step S1708, the PCF 402 stores the user consent as part of the subscription profile. At step S1709, the PCF 402 acknowledges the reception of the user consent to the AMF 401. At step S1710, the PCF 402 notifies the edge enabler server 500*a* that the user consent is available at the PCF 402.

At step S1711, the edge enabler server 500*a* receives the request for the UE specific parameter (e.g. UE ID) from the edge application server 700 or any request from the edge application server 700. Further, the edge enabler server 500*a* checks for the user consent is available for providing the UE specific parameter to the edge application server 700. Upon detecting that the user consent is available at the edge enabler server 500*a* and not verified, the edge enabler server 500*a* verifies the user consent by checking whether the user provides the permission to expose the UE specific parameter out of the core network 400. At step S1712, upon detecting that the user consent is not available at the edge enabler server 500*a* and notification about the availability of the user consent at the PCF 402 is received, the edge enabler server 500*a* fetches the user consent from the PCF 402. In an embodiment, the edge enabler server 500*a* identifies the user consent stored at the PCF 402 for fetching the user consent based on the subscription ID of the UE 300 or the application ID. At step S1713, the edge enabler server 500*a* stores the user consent and deletes the notification. Further, the edge enabler server 500*a* verifies the user consent. At step S1714, edge enabler server 500*a* responses with the UE specific parameter to the edge application server 700, in response to verifying the user consent.

The various actions, acts, blocks, steps, or the like in the sequential diagram in FIG. 17 may be performed in the order presented, in a different order or simultaneously. Further, in some embodiments, some of the actions, acts, blocks, steps, or the like may be omitted, added, modified, skipped, or the like without departing from the scope of the invention.

Figure 18:
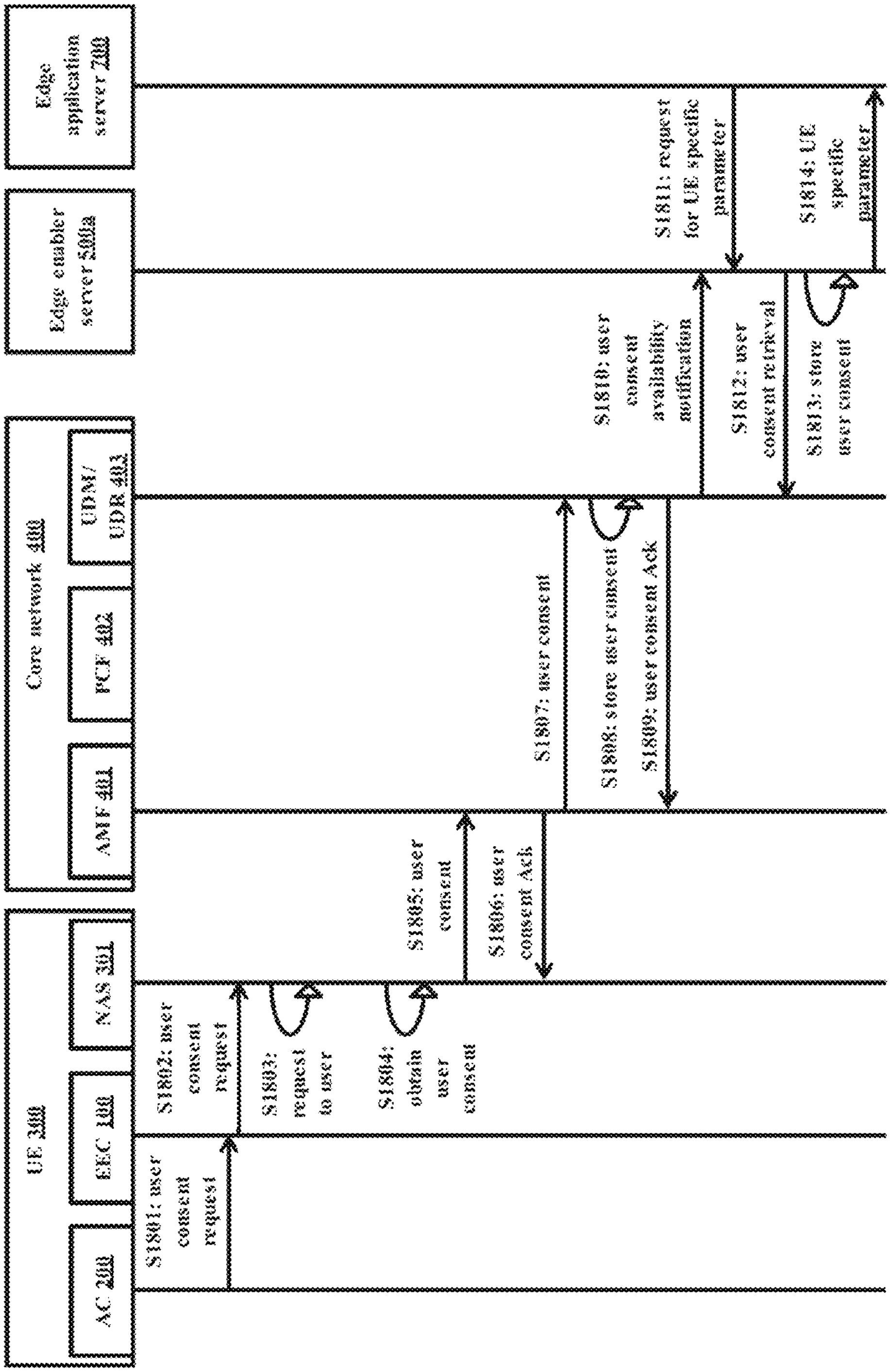
FIG. 18 is a sequential diagram illustrating signaling between the devices in the system for providing the service to the edge application server in response to obtaining the user consent from the non-access stratum layer through the UDM/UDR, according to an embodiment as disclosed herein.

FIG. 18 is a sequential diagram illustrating signaling between the devices in the system 1000 for providing the service to the edge application server 700 in response to obtaining the user consent by the NAS 301 through the UDM/UDR 403, according to an embodiment as disclosed herein. At step S1801, the application client 200 triggers the edge enabler client 100 to initiate the steps to obtain the user consent based on the request received from the edge application server 700 or the edge application 600. In an embodiment, the edge application server 700 triggers the application client 200 to initiate steps for obtaining the user consent. At step S1802, the edge enabler client 100 requests the NAS 301 to obtain the user consent. At step S1803, the NAS 301 request the user for the user consent. The user grants/updates the user consent on the UE 300 for providing the service to the edge application 600. At step S1804, the NAS 301 authorizes the user for accepting the grant of the user consent. At step S1805, the NAS 301 sends the user consent as the NAS user data payload or alternatively as part of the control plane payload to the AMF 401 by securing the user consent using the NAS security key. At step S1806, the AMF 401 acknowledges the reception of the user consent to the NAS 301. At step S1807, the AMF 401 sends the user consent to the UDM/UDR 403. At step S1808, the UDM/UDR 403 stores the user consent as part of the subscription profile. At step S1809, the UDM/UDR 403 acknowledges the reception of the user consent to the AMF 401. At step S1810, the UDM/UDR 403 notifies the edge enabler server 500*a* that the user consent is available at the UDM/UDR 403.

At step S1811, the edge enabler server 500*a* receives the request for the UE specific parameter (e.g. UE ID) from the edge application server 700 or any request from the edge application server 700. Further, the edge enabler server 500*a* checks for the user consent is available for providing the UE specific parameter to the edge application server 700. Upon detecting that the user consent is available at the edge enabler server 500*a* and not verified, the edge enabler server 500*a* verifies the user consent by checking whether the user provides the permission to expose the UE specific parameter out of the core network 400. At step S1812, upon detecting that the user consent is not available at the edge enabler server 500*a* and notification about the availability of the user consent at the UDM/UDR 403 is received, the edge enabler server 500*a* fetches the user consent from the UDM/UDR 403. In an embodiment, the edge enabler server 500*a* identifies the user consent stored at the UDM/UDR 403 for fetching the user consent based on the subscription ID of the UE 300 or the application ID. At step S1813, the edge enabler server 500*a* stores the user consent and deletes the notification. Further, the edge enabler server 500*a* verifies the user consent. At step S1814, edge enabler server 500*a* responses with the UE specific parameter to the edge application server 700, in response to verifying the user consent.

The various actions, acts, blocks, steps, or the like in the sequential diagram in FIG. 18 may be performed in the order presented, in a different order or simultaneously. Further, in some embodiments, some of the actions, acts, blocks, steps, or the like may be omitted, added, modified, skipped, or the like without departing from the scope of the invention.

Figure 19:
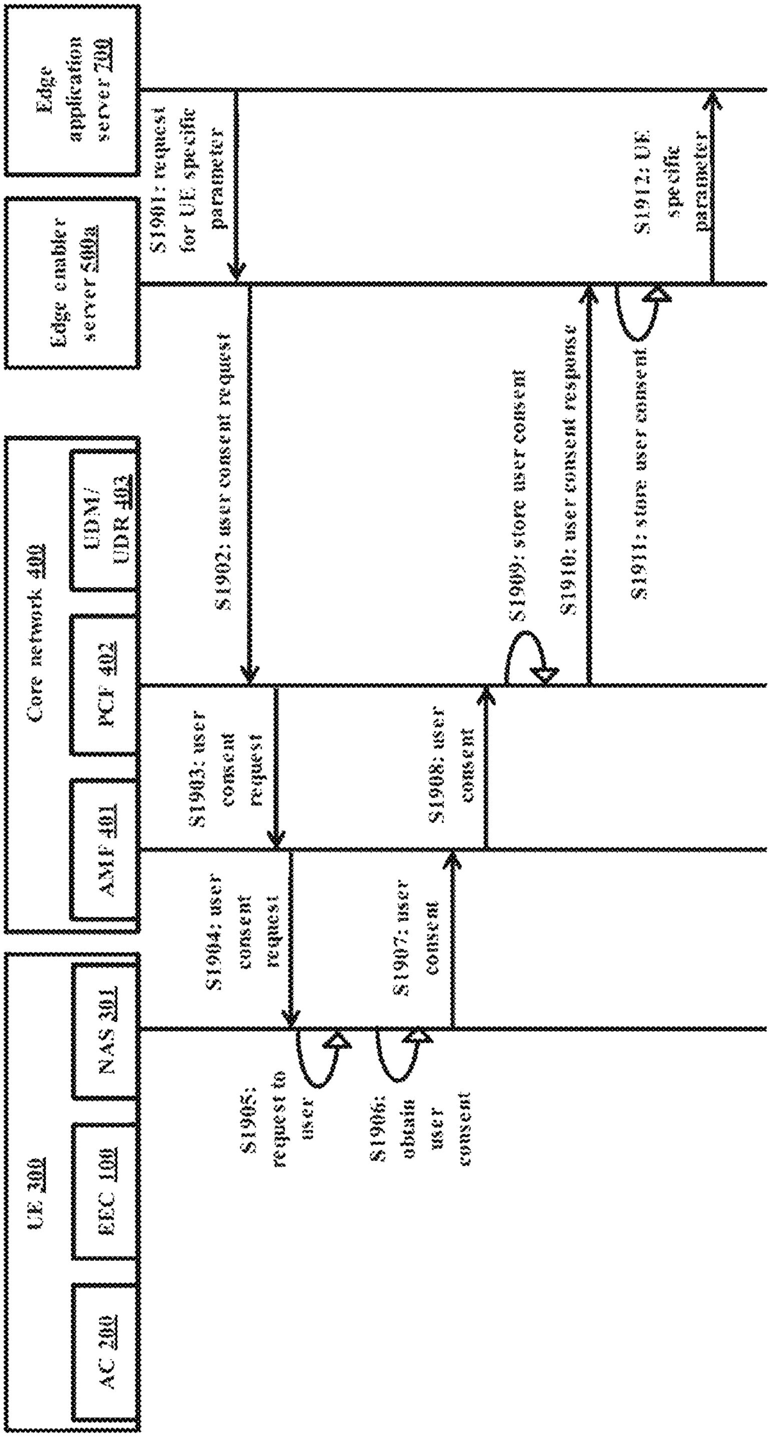
FIG. 19 is a sequential diagram illustrating signaling between the devices in the system for providing the service to the edge application server in response to receiving the request for the service from the edge application server and the user consent through the PCF, according to an embodiment as disclosed herein.

FIG. 19 is a sequential diagram illustrating signaling between the devices in the system 1000 for providing the service to the edge application server 700 in response to receiving the request for the service from the edge application server 700 and the user consent through the PCF 402, according to an embodiment as disclosed herein. At step S1901, the edge application server 700 requests for the UE specific parameter to the edge enabler server 500*a* for rendering the edge service for the edge application 600 subscribed by the user. In response to detecting that the user consent is not available at the edge enabler server 500*a*, the edge enabler server 500*a* triggers the steps to obtain the user consent from the user via the core network 400. At step S1902, the edge enabler server 500*a* request the PCF 402 for obtaining the user consent.

The edge enabler server 500*a* provides the subscription ID of the UE 300 or the application ID to the PCF 402 while requesting to obtain the user consent. The PCF 402 checks whether the user consent is available at the PCF 402, in response to receiving the request from the edge enabler server 500*a*. In an embodiment, the PCF 402 retrieves the user consent based on the subscription ID of the UE 300 or the application ID, and sends the user consent to the edge enabler server 500*a* when the user consent is available at the PCF 402. At step S1903, the PCF 402 requests the AMF 401 to obtain the user consent, when the user consent is not available at the PCF 402. At step S1904, the AMF 401 requests the NAS 301 to obtain the user consent. At step S1905, the NAS 301 requests the user to provide the user consent. The user grants/updates the user consent on the UE 300 for providing the service to the edge application 600. At step S1906, the NAS 301 authorizes the user for accepting the grant of the user consent. At step S1907, the NAS 301 sends the user consent as the NAS user data payload or alternatively as part of the control plane payload to the AMF 401 by securing the user consent using the NAS security key.

At step S1908, the AMF 401 sends the user consent to the PCF 402. At step S1909, the PCF 402 stores the user consent as part of the subscription profile. At step S1910, the PCF 402 responses the edge enabler server 500*a* with the user consent. At step S1911, the edge enabler server 500*a* stores the user consent. Further, the edge enabler server 500*a* verifies the user consent by checking whether the user provides the permission to expose the UE specific parameter out of the core network 400. At step S1912, the edge enabler server 500*a* responses with the UE specific parameter to the edge application server 700, in response to verifying the user consent.

The various actions, acts, blocks, steps, or the like in the sequential diagram in FIG. 19 may be performed in the order presented, in a different order or simultaneously. Further, in some embodiments, some of the actions, acts, blocks, steps, or the like may be omitted, added, modified, skipped, or the like without departing from the scope of the invention.

Figure 20:
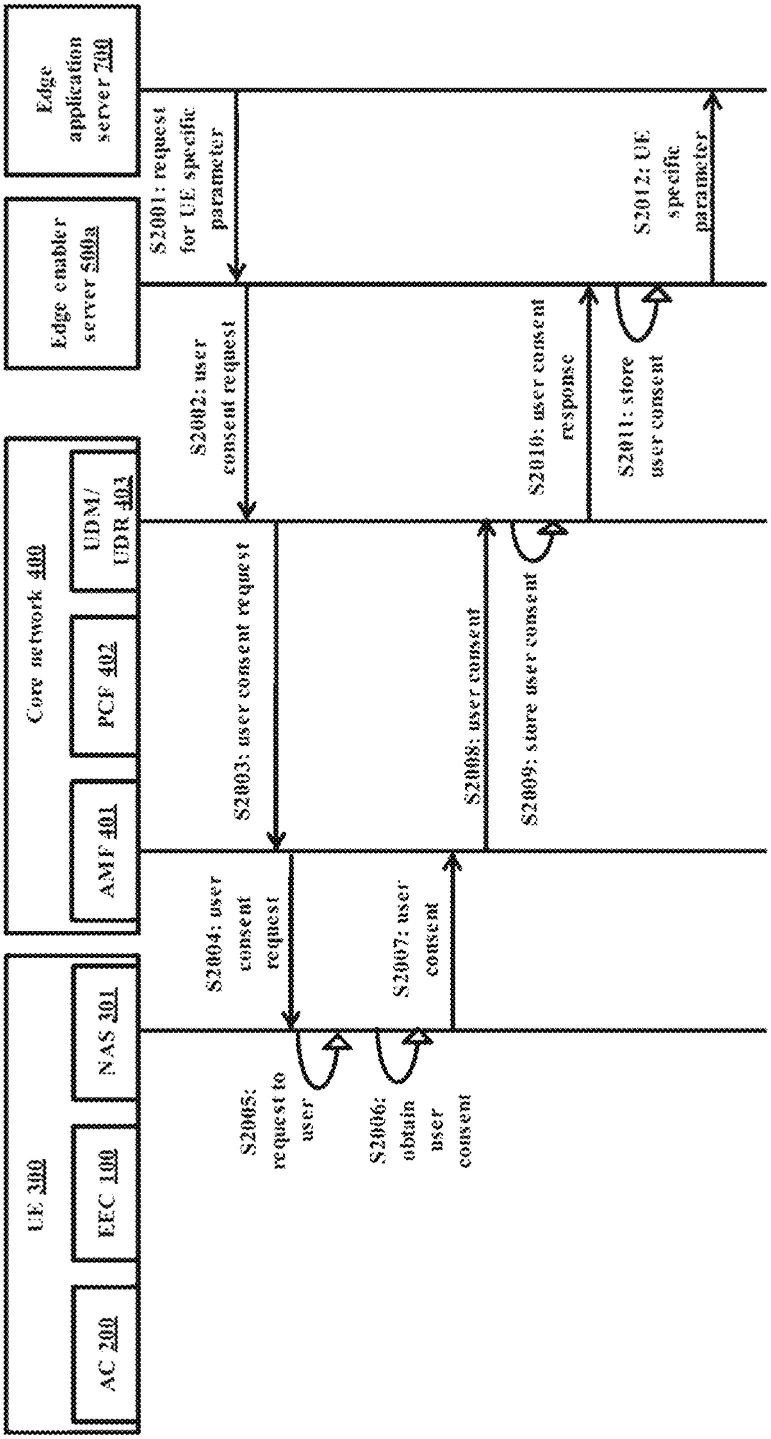
FIG. 20 is a sequential diagram illustrating signaling between the devices in the system for providing the service to the edge application server in response to receiving the request for the service from the edge application server and the user consent through the UDM/UDR, according to an embodiment as disclosed herein.

FIG. 20 is a sequential diagram illustrating signaling between the devices in the system 1000 for providing the service to the edge application server 700 in response to receiving the request for the service from the edge application server 700 and the user consent through the UDM/UDR 403, according to an embodiment as disclosed herein. At step S2001, the edge application server 700 requests for the UE specific parameter to the edge enabler server 500*a* for rendering the edge service for the edge application 600 subscribed by the user. In response to detecting that the user consent is not available at the edge enabler server 500*a*, the edge enabler server 500*a* triggers the steps to obtain the user consent from the user via the core network 400.

At step S2002, the edge enabler server 500*a* request the UDM/UDR 403 for obtaining the user consent. The edge enabler server 500*a* provides the subscription ID of the UE 300 or the application ID to the UDM/UDR 403 while requesting to obtain the user consent. The UDM/UDR 403 checks whether the user consent is available at the UDM/UDR 403, in response to receiving the request from the edge enabler server 500*a*. In an embodiment, the UDM/UDR 403 retrieves the user consent based on the subscription ID of the UE 300 or the application ID, and sends the user consent to the edge enabler server 500*a* when the user consent is available at the UDM/UDR 403. At step S2003, the UDM/UDR 403 requests the AMF 401 to obtain the user consent, when the user consent is not available at the UDM/UDR 403. At step S2004, the AMF 401 requests the NAS 301 to obtain the user consent. At step S2005, the NAS 301 requests the user to provide the user consent.

The user grants/updates the user consent on the UE 300 for providing the service to the edge application 600. At step S2006, the NAS 301 authorizes the user for accepting the grant of the user consent. At step S2007, the NAS 301 sends the user consent as the NAS user data payload or alternatively as part of the control plane payload to the AMF 401 by securing the user consent using the NAS security key. At step S2008, the AMF 401 sends the user consent to the UDM/UDR 403. At step S2009, the UDM/UDR 403 stores the user consent as part of the subscription profile. At step S2010, the UDM/UDR 403 responses the edge enabler server 500*a* with the user consent. At step S2011, the edge enabler server 500*a* stores the user consent. Further, the edge enabler server 500*a* verifies the user consent by checking whether the user provides the permission to expose the UE specific parameter out of the core network 400. At step S2012, the edge enabler server 500*a* responses with the UE specific parameter to the edge application server 700, in response to verifying the user consent.

The various actions, acts, blocks, steps, or the like in the sequential diagram in FIG. 20 may be performed in the order presented, in a different order or simultaneously. Further, in some embodiments, some of the actions, acts, blocks, steps, or the like may be omitted, added, modified, skipped, or the like without departing from the scope of the invention.

FIG. 21 schematically illustrates the server according to embodiments of the present disclosure.

Referring to the FIG. 21, the server 500 may include a processor 2110, a transceiver 2120 and a memory 2130. However, all of the illustrated components are not essential. The server 500 may be implemented by more or less components than those illustrated in FIG. 21. In addition, the processor 2110 and the transceiver 2120 and the memory 2130 may be implemented as a single chip according to another embodiment.

The server 500 may correspond to edge enabler server 500*a* and CAPIF core function device 500*b* described above. For example, the server 500 may correspond to the edge enabler server 500*a* illustrated in FIG. 2E and FIG. 3.

The aforementioned components will now be described in detail.

The processor 2110 may include one or more processors or other processing devices that control the proposed function, process, and/or method. Operation of the server 500 may be implemented by the processor 2110.

The transceiver 2120 may include a RF transmitter for up-converting and amplifying a transmitted signal, and a RF receiver for down-converting a frequency of a received signal. However, according to another embodiment, the transceiver 2120 may be implemented by more or less components than those illustrated in components.

The transceiver 2120 may be connected to the processor 2110 and transmit and/or receive a signal. The signal may include control information and data. In addition, the transceiver 2120 may receive the signal through a wireless channel and output the signal to the processor 2110. The transceiver 2120 may transmit a signal output from the processor 2110 through the wireless channel.

The memory 2130 may store the control information or the data included in a signal obtained by the server 500. The memory 2130 may be connected to the processor 2110 and store at least one instruction or a protocol or a parameter for the proposed function, process, and/or method. The memory 2130 may include read-only memory (ROM) and/or random access memory (RAM) and/or hard disk and/or CD-ROM and/or DVD and/or other storage devices.

The embodiments disclosed herein can be implemented using at least one software program running on at least one hardware device and performing network management functions to control the elements.

FIG. 22 illustrates a user equipment (UE) according to embodiments of the present disclosure.

Referring to the FIG. 22, the UE 2200 may include a processor 2210, a transceiver 2220 and a memory 2230. However, all of the illustrated components are not essential. The UE 2200 may be implemented by more or less components than those illustrated in FIG. 22. In addition, the processor 2210 and the transceiver 2220 and the memory 2230 may be implemented as a single chip according to another embodiment.

The UE 2200 may correspond to the UE described above. For example, UE 2200 may correspond to UE 300 illustrated in FIG. 2C and FIG. 10.

The aforementioned components will now be described in detail.

The processor 2210 may include one or more processors or other processing devices that control the proposed function, process, and/or method. Operation of the UE 2200 may be implemented by the processor 2210.

The transceiver 2220 may include a RF transmitter for up-converting and amplifying a transmitted signal, and a RF receiver for down-converting a frequency of a received signal. However, according to another embodiment, the transceiver 2220 may be implemented by more or less components than those illustrated in components.

The transceiver 2220 may be connected to the processor 2210 and transmit and/or receive a signal. The signal may include control information and data. In addition, the transceiver 2220 may receive the signal through a wireless channel and output the signal to the processor 2210. The transceiver 2220 may transmit a signal output from the processor 2210 through the wireless channel.

The memory 2230 may store the control information or the data included in a signal obtained by the UE 2200. The memory 2230 may be connected to the processor 2210 and store at least one instruction or a protocol or a parameter for the proposed function, process, and/or method. The memory 2230 may include read-only memory (ROM) and/or random access memory (RAM) and/or hard disk and/or CD-ROM and/or DVD and/or other storage devices.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a network entity in a wireless communication system, the method comprising:

receiving a request for accessing a service;

determining whether a user consent for accessing the service is stored at the network entity;

in case that the user consent is not available at the network entity, transmitting a request for the user consent including the requested service;

in response to the request for the user consent, receiving the user consent for authorizing the access of the service;

storing the received user consent;

providing the service based on the user consent;

receiving, a user consent update request;

generating a first one time password (OTP) for the user consent update;

transmitting the first OTP;

receiving a first user consent update notification comprising the user consent update and a second OTP;

verifying the second OTP based on the first OTP;

in case that the first OTP and the second OTP are matched, transmitting a user consent update response; and updating the user consent.

2. The method of claim 1, further comprising:

transmitting a second user consent update notification.

3. The method as claimed in claim 1, further comprising:

receiving a request for a user equipment (UE) specific parameter;

and transmitting the UE specific parameter.

4. The method of claim 3, further comprising:

determining whether providing of the UE specific parameter to another device is permitted.

5. The method of claim 4, further comprising:

in case that the user consent is not verified, verifying the user consent by determining whether providing of the UE specific parameter to another device is permitted.

6. A network entity in a wireless communication system, the network entity comprising:

a hardware transceiver;

a hardware processor coupled with the hardware transceiver and configured to:

receive a request for accessing a service, determine whether a user consent for accessing the service is stored at the network entity, in case that the user consent is not available at the network entity, transmit a request for the user consent including the requested service, store the received user consent, provide the service based on the user consent, receive a user consent update request, generate a first one time password (OTP) for the user consent update, transmit the first OTP, receive a first user consent update notification comprising the user consent and a second OTP, verify the second OTP based on the first OTP, in case that the first OTP and the second OTP are matched, transmit a user consent update response, and update the user consent.

7. The network entity of claim 6, wherein the hardware processor is further configured to:

transmit a second user consent update notification.

8. The network entity of claim 6, wherein the hardware processor is further configured to:

receive a request for a user equipment (UE) specific parameter, and transmit the UE specific parameter.

9. The network entity of claim 8, wherein the hardware processor is further configured to:

determine whether providing of the UE specific parameter to another device is permitted.

10. The network entity of claim 9, wherein the hardware processor is further configured to:

in case that the user consent is not verified, verify the user consent by determining whether providing of the UE specific parameter to another device is permitted.

* * * * *